United States Patent
Yuan et al.

(10) Patent No.: US 10,834,608 B1
(45) Date of Patent: Nov. 10, 2020

(54) FACILITATING MODEL-DRIVEN AUTOMATED CELL ALLOCATION IN FIFTH GENERATION (5G) OR OTHER ADVANCED NETWORKS

(71) Applicant: AT&T Intellectual Property I, L.P., Atlanta, GA (US)

(72) Inventors: Wei Yuan, Frisco, TX (US); Yuning Yang, Basking Ridge, NJ (US); Carlos Eduardo De Andrade, Gainesville, FL (US); Nemmara Shankaranarayanan, Bridgewater, NJ (US); Sarat Puthenpura, Berkeley Heights, NJ (US); Wenjie Zhao, Princeton, NJ (US); Slawomir Stawiarski, Carpentersville, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/513,588

(22) Filed: Jul. 16, 2019

(51) Int. Cl.
*H04W 40/00* (2009.01)
*H04W 16/18* (2009.01)
*H04W 24/02* (2009.01)

(52) U.S. Cl.
CPC ........... *H04W 16/18* (2013.01); *H04W 24/02* (2013.01)

(58) Field of Classification Search
None
See application file for complete search history.

(56) References Cited

U.S. PATENT DOCUMENTS

| | | | |
|---|---|---|---|
| 5,796,722 | A | 8/1998 | Kotzin et al. |
| 6,314,301 | B1 | 11/2001 | Dorenbosch et al. |
| 6,477,143 | B1 | 11/2002 | Ginossar |
| 6,826,620 | B1 | 11/2004 | Mawhinney et al. |
| 7,120,467 | B2 | 10/2006 | Umesh et al. |
| 7,813,329 | B2 | 10/2010 | Mori et al. |
| 7,941,148 | B2 | 5/2011 | Roskowski et al. |
| 8,014,362 | B2 | 9/2011 | Panico et al. |
| 8,161,182 | B1 | 4/2012 | Cheng et al. |
| 8,406,146 | B2 | 3/2013 | Quilty et al. |
| 8,737,375 | B2 | 5/2014 | Puthenpura et al. |

(Continued)

OTHER PUBLICATIONS

Notice of Allowance dated Jan. 16, 2014 for U.S. Appl. No. 13/557,960, 21 pages.

(Continued)

*Primary Examiner* — Suhail Khan
(74) *Attorney, Agent, or Firm* — Amin, Turocy & Watson, LLP

(57) ABSTRACT

Facilitating model-driven automated cell allocation in advanced networks (e.g., 5G and beyond) is provided herein. Operations of a method can comprise determining, by a system comprising a processor, a solution to an integer programming problem based on input data associated with a network inventory and configuration data for network devices of a group of network devices included in a communications network. Also, the method can comprise determining, by the system, respective cell identities and respective root sequence index assignments for the network devices. Further, the method can comprise implementing, by the system, a deployment of the respective cell identities and respective root sequence index assignments at the network devices.

20 Claims, 15 Drawing Sheets

(56) References Cited

U.S. PATENT DOCUMENTS

| | | |
|---|---|---|
| 8,937,934 B2 | 1/2015 | Puthenpura et al. |
| 2003/0218974 A1 | 11/2003 | Zuniga |
| 2006/0128394 A1 | 6/2006 | Turina et al. |
| 2008/0039089 A1 | 2/2008 | Berkman et al. |
| 2008/0039141 A1 | 2/2008 | Claussen et al. |
| 2008/0181291 A1 | 7/2008 | Zhou et al. |
| 2008/0239953 A1 | 10/2008 | Bai et al. |
| 2009/0034453 A1 | 2/2009 | Motegi et al. |
| 2009/0047956 A1 | 2/2009 | Moe et al. |
| 2009/0124262 A1 | 5/2009 | Vela et al. |
| 2009/0129448 A1 | 5/2009 | Koslov et al. |
| 2009/0163223 A1 | 6/2009 | Casey |
| 2009/0186627 A1 | 7/2009 | Zhang |
| 2010/0088410 A1 | 4/2010 | Ridley |
| 2010/0232390 A1 | 9/2010 | Varma et al. |
| 2010/0254354 A1 | 10/2010 | Sutivong et al. |
| 2011/0130144 A1 | 6/2011 | Schein et al. |
| 2011/0176424 A1 | 7/2011 | Yang et al. |
| 2011/0182224 A1 | 7/2011 | Ishii |
| 2011/0228687 A1 | 9/2011 | Catovic et al. |
| 2011/0292821 A1 | 12/2011 | Chin et al. |
| 2012/0044908 A1 | 2/2012 | Spinelli et al. |
| 2012/0236717 A1 | 9/2012 | Saska et al. |
| 2013/0077482 A1 | 3/2013 | Krishna et al. |
| 2013/0130691 A1 | 5/2013 | Zhu et al. |
| 2013/0337814 A1 | 12/2013 | Wong et al. |
| 2015/0289216 A1* | 10/2015 | Xing .................. H04W 56/0015 455/422.1 |
| 2017/0078062 A1* | 3/2017 | Park ...................... H04L 5/0048 |
| 2017/0295497 A1* | 10/2017 | MacMullan .......... H04W 24/02 |
| 2017/0311276 A1* | 10/2017 | Tsai ...................... H04B 7/0617 |
| 2017/0332335 A1* | 11/2017 | Au ........................ H04W 52/38 |

OTHER PUBLICATIONS

Non-Final Office Action dated Apr. 21, 2014 for U.S. Appl. No. 13/686,868, 25 pages.
Non-Final Office Action dated Apr. 8, 2014 for U.S. Appl. No. 13/691,495, 21 pages.
Non-Final Office Action dated Jul. 23, 2014 for U.S. Appl. No. 14/035,751, 22 pages.
Notice of Allowance dated Sep. 12, 2014 for U.S. Appl. No. 14/253,768, 29 pages.
Final Office Action dated Oct. 14, 2014 for U.S. Appl. No. 13/691,495, 28 pages.
Final Office Action dated Nov. 21, 2014 for U.S. Appl. No. 14/035,751, 27 pages.
Non-Final Office Action dated Feb. 25, 2015 for U.S. Appl. No. 13/691,495, 28 pages.
Non-Final Office Action dated Jul. 7, 2015 for U.S. Appl. No. 14/719,957, 23 pages.
Final Office Action dated Aug. 13, 2015 for U.S. Appl. No. 13/691,495, 14 pages.
Final Office Action dated Nov. 25, 2015 for U.S. Appl. No. 14/719,957, 21 pages.
Non-Final Office Action dated Apr. 28, 2017 for U.S. Appl. No. 15/014,503, 28 pages.
Non-Final Office Action dated Apr. 1, 2019 for U.S. Appl. No. 16/148,260, 27 pages.

* cited by examiner

FACILITATING MODEL-DRIVEN AUTOMATED CELL ALLOCATION IN FIFTH GENERATION (5G) OR OTHER ADVANCED NETWORKS

TECHNICAL FIELD

This disclosure relates generally to the field of network communicating and, more specifically, to facilitating optimization of physical cell identity and root sequence index assigned to cells in fifth generation (5G) or other advanced networks.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) for wireless communications. Unique challenges exist to provide levels of service associated with forthcoming 5G, and/or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
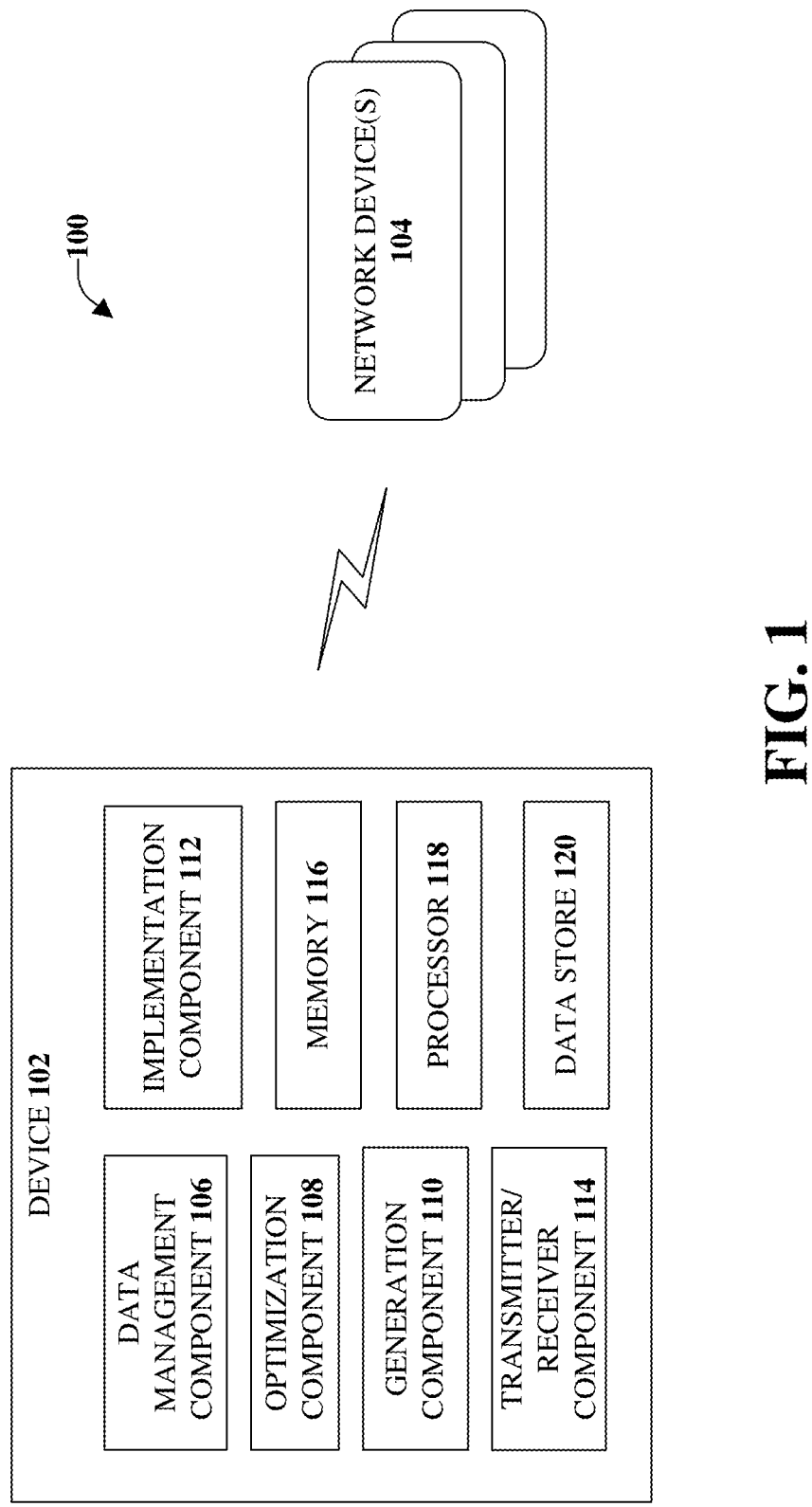
FIG. 1 illustrates an example, non-limiting, system for facilitating a model-driven automated cell physical cell identity/root sequence index allocation optimization in advanced networks in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate model-driven automated cell allocation in advanced networks. Telecommunication carriers are faced with an explosive growth in mobile traffic, as well as other types of applications that are communicating over cellular networks. To meet the explosive growth in mobile traffic and to support varieties of applications which demand stringent latency requirements in their networks, telecommunication carriers are deploying 5G mobile networks. Physical Cell Identity (PCI) and Root Sequence Index (RSI) assignments are necessary for 5G network deployment. In addition, to keep the deployment and operational costs low, the PCI/RSI assignment process should be optimized and automated. Further, the PCI and RSI can be planned together as discussed herein.

The PCI is the identifier of a cell in the physical layer of a 5G NR network. The total number of PCIs in 5G NR are limited to 1008. Thus, the PCIs need to be reused and several cells in a network will share the same PCI. PCI conflicts in PCI code allocation lead to network performance degradations in UE cell (re)selections, handovers, UE synchronization and RF condition status estimates. PCI conflicts include PCI collisions and PCI confusions.

For example, in 5G mobile networks, a cell should have assigned PCI and RSI in order for the cell to be operational. In 5G networks, a User Equipment (UE) device can read the PCI when the UE device sync-ups with the network (a network device) in order for the UE device to be able to receive downlink data from the network. The UE device also gains uplink access to the network based on random access preambles which are generated based on RSI of the cells. Thus, PCI and RSI assignment are utilized in order for 5G network to be operational.

Several rules should be followed in PCI/RSI assignment for maintaining good network performance Due to the limited number of PCI/RSI codes, different cells may have to use the same PCI/RSI codes in the network. However, not every cell can use the same PCI/RSI. For example, a 5G cell cannot have two neighboring cells assigned with the same PCI. Thus, PCI/RSI assignment can be modeled as an optimization problem where PCI/RSI reuse distance (e.g., the distance between two cells sharing the same PCI/RSI) is maximized while multiple assignment rules are followed.

In addition to the methods for solving the optimization problem of PCI/RSI assignment, disclosed herein are various aspects that provide closed loop automation in assigning PCI/RSI based on changes in the communication network. The various implementations can be policy-driven where rules and constraints are set for the optimization through a policy module, for example. For example, in an implementation, network inventory and configuration data can be obtained from the communication network as input data, the optimization algorithms can be implemented on the input data based on optimization rules and constraints, and the optimal PCI/RSI assignment list generated by the algorithms can be executed and provided to the network.

The various aspects provided herein allocate PCIs to 5G cells, so as to avoid and/or minimize PCI conflicts, to avoid and/or minimize Physical Broadcast Channel (PBCH) reference signal (RS) collisions between neighbor cells, and to maximize PCI reuse distance. Further, the disclosed aspects cover optimal PCI designs for both macro-cells and small cells and provide automated PCI adjustment based on neighbor relation changes in 5G RAN. Further, the disclosed aspects can be implemented as a closed loop Self Organizing Network (SON) solution in an open network automation platform or a similar platform.

According to an embodiment, provided is a system that can comprise a processor and a memory that stores executable instructions that, when executed by the processor, facilitate performance of operations. The operations can comprise obtaining input data comprising a network inventory and configuration data for a group of network devices included in a communications network. The operations also can comprise implementing an optimization procedure on the input data comprising implementing the optimization procedure as an integer programming problem. Further, the operations can comprise generating a physical cell identity and root sequence index assignment list for the communications network based on implementing the optimization procedure. In an example, the device can be deployed in a non-standalone deployment architecture. Alternatively, the device can be deployed in a standalone deployment architecture.

The physical cell identity and root sequence index assignment list can be a first physical cell identity and root sequence index assignment list. Further, the operations can comprise evaluating a neighbor relation change introduced into the communications network. The operations also can comprise generating a second physical cell identity and root sequence index assignment list based on the evaluating. In an example, evaluating the neighbor relation change can comprise mitigating network performance degradation due to physical cell identity and root sequence index conflicts introduced by the neighbor relation change.

According to some implementations, the operations comprise assigning a secondary synchronization signal identification to the communications network comprising assigning respective secondary synchronization signal identifications to network devices of the group of network devices. Further to these implementations, the operations can comprise assigning primary synchronization signal identifications to respective cells at the network devices of the group of network devices.

In accordance with some implementations, the operations can comprise determining a maximum cell range that is mapped to a defined neighbor separation. Further, the operations can comprise implementing the optimization procedure as a closed loop self-organizing network solution.

According to some implementations, the operations can comprise enforcing a network control policy during implementing the optimization procedure based on a determination of a violation associated with defined assignment rules. In some implementations, the operations can comprise implementing the physical cell identity and root sequence index assignment list at respective network devices of the group of network devices.

Another embodiment can relate to a method that can comprise determining, by a system comprising a processor, a solution to an integer programming problem based on input data associated with a network inventory and configuration data for network devices of a group of network devices included in a communications network. Also, the method can comprise determining, by the system, respective cell identities and respective root sequence index assignments for the network devices based on the solution to the integer programming problem. Further, the method can comprise implementing, by the system, a deployment of the respective cell identities and respective root sequence index assignments at the network devices.

According to some implementations, the method can comprise assigning, by the system, a secondary synchronization signal identification to a cell site of the communications network. Further, the method can comprise, after assigning the secondary synchronization signal identification, assigning, by the system, primary synchronization signal identifications to respective cells at the network devices of the group of network devices. Further to these implementations, assigning the secondary synchronization signal identification comprises assigning respective secondary synchronization signal identifications to the network devices of the group of network devices.

According to some embodiments, the method can comprise determining, by the system, a maximum cell range mapped to a defined separation between the network devices of the group of network devices. In some embodiments, implementing the deployment can comprise mitigating, by the system, physical cell identity collision and false preambles in random access to user equipment devices. In accordance with some embodiments, implementing the deployment can comprise mitigating, by the system, changes to the physical cell identity and root sequence index assignment list for existing allocations.

Another embodiment can relate to a machine-readable storage medium, comprising executable instructions that, when executed by a processor, facilitate performance of operations. The operations can comprise implementing an allocation procedure for a communication network based on an inventory of network devices in the communication network and respective configuration data of the network devices. The allocation procedure can be implemented as an integer programming problem. Further, the operations can comprise generating an assignment list for the network devices. The assignment list can comprise a physical cell identity and root sequence index for the network devices. The operations also can comprise implementing the assignment list at the network devices.

According to some implementations, the operations can comprise determining a maximum cell range that is mapped to a defined neighbor separation. The operations can comprise, according to some implementations, assigning a secondary synchronization signal identification to a cell site of the communication network comprising assigning respective secondary synchronization signal identifications to the network devices. Further, the operations can comprise, after assigning the secondary synchronization signal identification, assigning primary synchronization signal identifications to respective cells at the network devices.

With reference initially to FIG. 1, illustrated is an example, non-limiting, system 100 for facilitating a model-driven automated cell PCI/RSI allocation optimization in advanced networks in accordance with one or more embodiments described herein. Aspects of systems (e.g., the system 100 and the like), apparatuses, or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 100 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated in FIG. 1, the system 100 can include a device 102 that can be communicatively coupled to a group of network devices 104. The group of network devices 104 can be associated with a mobile network (e.g., a 5G mobile network). The device 102 can be a network device and can be deployed in a non-standalone deployment architecture or in a deployed in a -standalone deployment architecture.

The device 102 can comprise a data management component 106, an optimization component 108, a generation component 110, an implementation component 112, a transmitter/receiver component 114, at least one memory 116, at least one processor 118, and at least one data store 120. Further, the network devices of the group of network devices 104 can comprise respective transmitter/receiver components, memories, processors, and data stores (not shown for purposes of simplicity).

The data management component 106 can obtain input data that can comprise a network inventory data associated with network devices of the group of network devices 104. The data management component 106 can also obtain configuration data associated with the network devices of the group of network devices 104.

The optimization component 108 can implement an optimization procedure on the input data. To implement the optimization procedure, the optimization component 108 can implement the optimization procedure as an integer programming problem. According to some implementations, the optimization component 108 can assign a secondary synchronization signal identification to the communications network. For example, assigning the secondary synchronization signal identification can comprise assigning respective secondary synchronization signal identifications to network devices of the group of network devices. Further, the optimization component 108 can assign primary synchronization signal identifications to respective cells at the network devices of the group of network devices.

The generation component 110 can generate a PCI and RSI assignment list for the communications network based on implementation of the optimization procedure by the optimization component 108. In an example, the PSI and RSI assignment list can be a first PCI and RSI assignment list. Further to this example, the data management component 106 can evaluate neighbor relation changes introduced into the system and the generation component 110 can generate an updated or second PSI and RSI assignment list based on the new evaluation by the data management component 106. For example, to evaluate the neighbor relation changes introduced into the system, the data management component 106 can be configured to mitigate network performance degradation due to physical cell identity and root sequence index conflicts introduced by the neighbor relation changes.

According to some implementations, to implement the optimization procedures, the optimization component 108 can determine a maximum cell range that is mapped to a defined neighbor separation. In some implementations, to implement the optimization procedures, the optimization component 108 can implement the optimization procedure as a closed loop self-organizing network solution.

In accordance with some implementations, the device 102 can enforce a network control policy during implementation of the optimization procedure based on a determination of a violation associated with defined assignment rules. Further details related to the enforcement of policies and/or rules will be provided below with respect to FIG. 10.

Further, the implementation component 112 can implement the physical cell identity and root sequence index assignment list at respective network devices of the group of network devices 104. For example, through the transmitter/receiver component 114, the implementation component 112 can provide indications of the assignment list(s) to the group of network devices 104.

The communication components (e.g., the transmitter/receiver component 114, the respective transmitter/receiver components of the network devices of the group of network devices 104) can be configured to transmit to, and/or receive data from, the device 102 and/or the respective network devices of the group of network devices 104. Through the transmitter/receiver component 114, the device 102 can concurrently transmit and receive data, can transmit and receive data at different times, or combinations thereof. Through the respective transmitter/receiver components, the network devices of the group of network devices can concurrently transmit and receive data, can transmit and receive data at different times, or combinations thereof.

The at least one memory 116 can be operatively connected to the at least one processor 118. The at least one memory 116 can store executable instructions that, when executed by the at least one processor 118 can facilitate performance of operations. Further, the at least one processor 118 can be utilized to execute computer executable components stored in the at least one memory 116 and/or the at least one data store 120.

For example, the at least one memory 116 can store protocols associated with facilitating model-driven automated cell allocation in advanced networks as discussed herein. Further, the at least one memory 116 can facilitate action to control communication between the device 102 and the network devices of the group of network devices 104, such that the device 102 can employ stored protocols and/or algorithms to achieve improved communications in a wireless network as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 118 can facilitate respective analysis of information related to facilitating model-driven automated cell allocation in advanced networks. The at least one processor 118 can be a processor dedicated to analyzing and/or generating information received, a processor that controls one or more components of the device 102, and/or a processor that both analyzes and generates information received and controls one or more components of the device 102.

Further, the term network device (e.g., network node, network node device) is used herein to refer to any type of network node serving mobile devices and/or connected to other network nodes, network elements, or another network node from which the mobile devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, a Remote Radio Unit (RRU), a Remote Radio Head (RRH), nodes in distributed antenna system (DAS), and the like.

In further detail, there are 1,008 unique PCIs available in a 5G network, for example. The available PCIs are given by the following format:

$$N_{ID}^{cell} = 3N_{ID}^{(1)} + N_{ID}^{(2)}$$

where $N_{ID}^{(1)} \in \{0, 1, \ldots, 335\}$ and $N_{ID}^{(2)} \in \{0,1,2\}$. $N_{ID}^{(1)}$ is referred to as a Primary Synchronization Signal (PSS) identifier (ID), and $N_{ID}^{(2)}$ is referred to as a Secondary Synchronization Signal (SSS) ID.

Figure 2B:
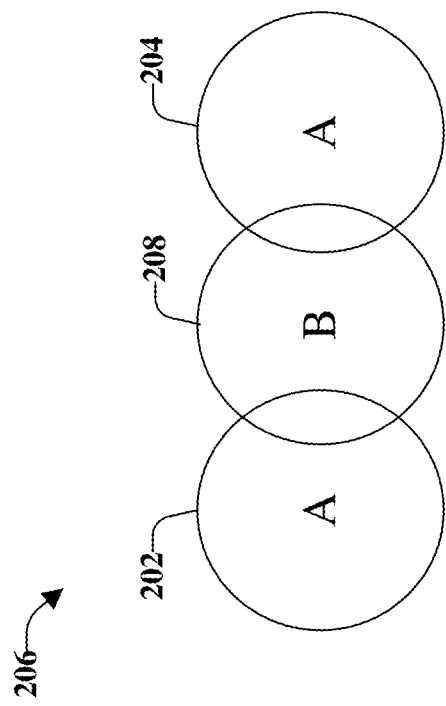
FIG. 2B illustrates a schematic representation of physical cell identity confusion that can occur based on a same physical cell identity being assigned for neighbors of a cell in a communications network.
Figure 2A:
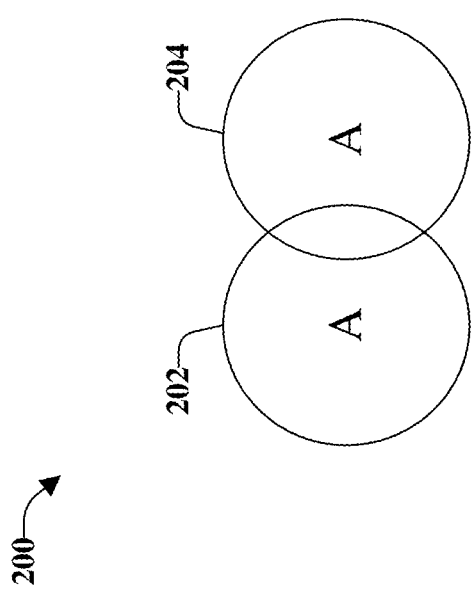
FIG. 2A illustrates a schematic representation of physical cell identity collision that can occur between two cells in a communications network.

Several rules should be followed during PCI assignment. First, PCI collisions should be avoided. A PCI collision is defined as when two neighboring cells (e.g., two 5G neighboring cells) are assigned with the same PCI. For example, FIG. 2A illustrates a schematic representation of Physical Cell Identity (PCI) collision that can occur between two cells in a communications network 200. As depicted in FIG. 2A, the first circle represents a first cell 202, which is assigned PCI A. The second circle represents a second cell 204, which is also assigned PCI A. As illustrated, at least a portion of the first cell 202 and at least a portion of the second cell 204 overlap. Accordingly, a UE device at the two neighboring cells will not be able to synchronize with the network since the UE device cannot distinguish the first cell 202 from the second cell 204. Therefore, no adjacent cells should have the same PCI.

Secondly, PCI confusions should also be avoided. A PCI confusion is defined as when two cells with the same PCI are not neighbors, but share a same neighbor. FIG. 2B illustrates a schematic representation of PCI confusion that can occur based on a same PCI being assigned for neighbors of a cell in a communications network 206. For example, illustrated are the first cell 202, the second cell 204, and a third cell 208. The first cell 202 and the second cell 204 are assigned PCI A. The third cell 208 is assigned PCI B. PCI confusion occurs because PCI A is assigned to two cells (e.g., the first cell 202 and the second cell 204), which share the same neighbor (e.g., the third cell 208). In the case of PCI confusions, a UE device at the third cell 208 (e.g., PCI B) will not be able to complete handovers to either of the two neighboring cells. This is because the UE device is confused on which cell to handover to since the neighboring cells have the same assigned PCI. Therefore, a cell cannot have two neighbors sharing the same PCI.

Figure 3:
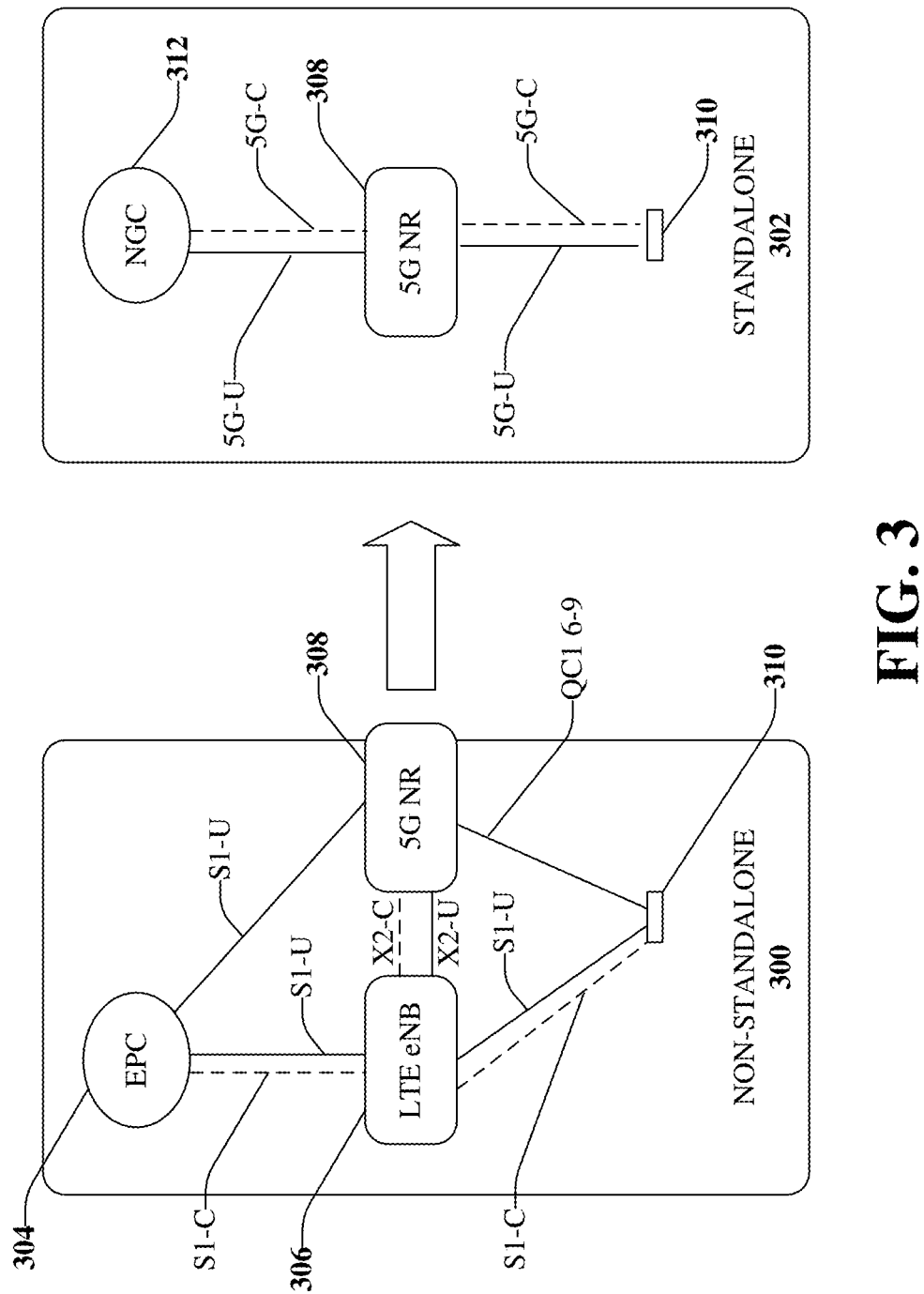
FIG. 3 illustrates a comparison between a non-standalone deployment architecture and a standalone deployment architecture.

According to some implementations, a target deployment can be to have a nationwide network (e.g., a nationwide 5G network) for supporting a wide range of real-world applications. The range of real-world applications can extend from Internet of Things (IoT) device monitoring to Augmented Reality/Virtual Reality (AR/VR) applications to connected cars, and so on. For such an implementation, the nationwide network deployment can take a number of stages to reach its final stage as depicted in FIG. 3, which illustrates a comparison between a non-standalone deployment architecture 300 and a standalone deployment architecture 302. In early 5G deployment, non-standalone deployment architecture 300 is employed where Long Term Evolution (LTE) Radio Access Network (RAN) provides control functions for 5G cells. In the non-standalone deployment architecture 300, an Evolved Packet Core (EPC 304) communicates with an LTE eNB 306 and indirectly with a 5G NR 308. The LTE eNB 306 and the 5G NR 308 are also in communication with one another and with a UE device 310. In the standalone deployment architecture 302, a Next-Generation Core (NGC 312) interfaces directly with the 5G NR 308.

Figure 4:
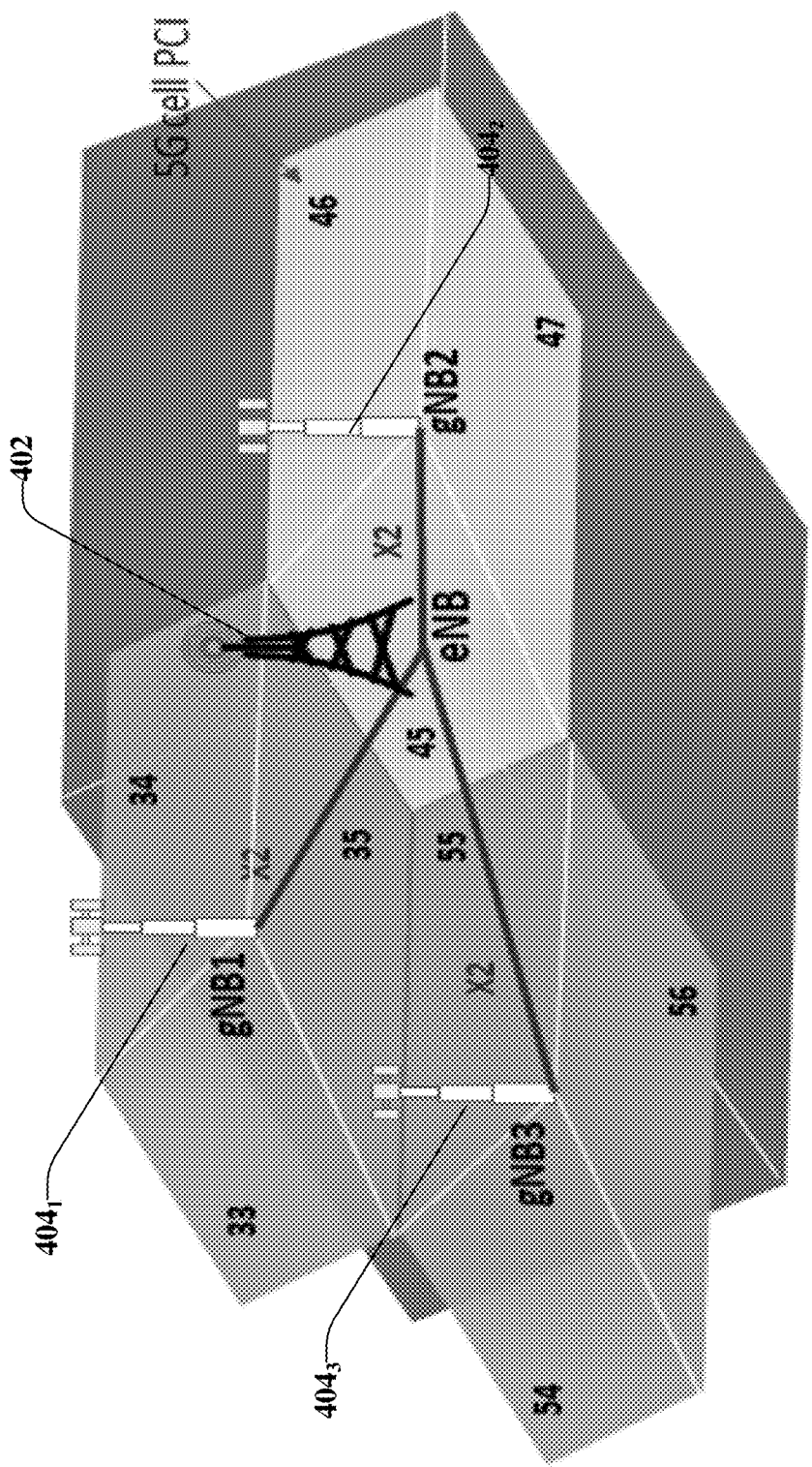
FIG. 4 illustrates a communication network that is deployed as a non-standalone deployment scenario.

In further detail, FIG. 4 illustrates a communication network 400 that is deployed as a non-standalone deployment scenario. An LTE eNodeB 402 could provide control functions for multiple 5G gNodeBs 4041, 4042, and 4043 via an X2 interface between the gNodeBs. The eNodeB 402 providing the control functions is referred to as a "master eNodeB" of those gNodeBs and the cells at the gNodeBs. In the non-standalone deployment, PCI confusions should be avoided in the sense that, 5G cells sharing the same master eNodeB cannot be assigned with same PCIs.

Another rule on PCI assignment is the PCI mod-4 requirement. For example, if two PCI codes have the same remainder when dividing by four (4), those PCI codes should not be assigned to two adjacent 5G cells. An example of mod-4 violation is now made with reference to FIG. 2, where the first cell 202 is assigned numeral 15 and the second cell 204 is assigned numeral 215. This is a PCI mod-4 violation because the two adjacent cells have PCI codes with the same value after the modulo operation. In further detail, taking numeral 15 and dividing by 4 gives remainder 3 (for the first cell 202) and taking 215 and dividing by 4 gives remainder 3. Mod-4 PCIs in neighboring cells may cause interferences on PBCH Demodulation Reference Signals (DMRS).

Figure 5:
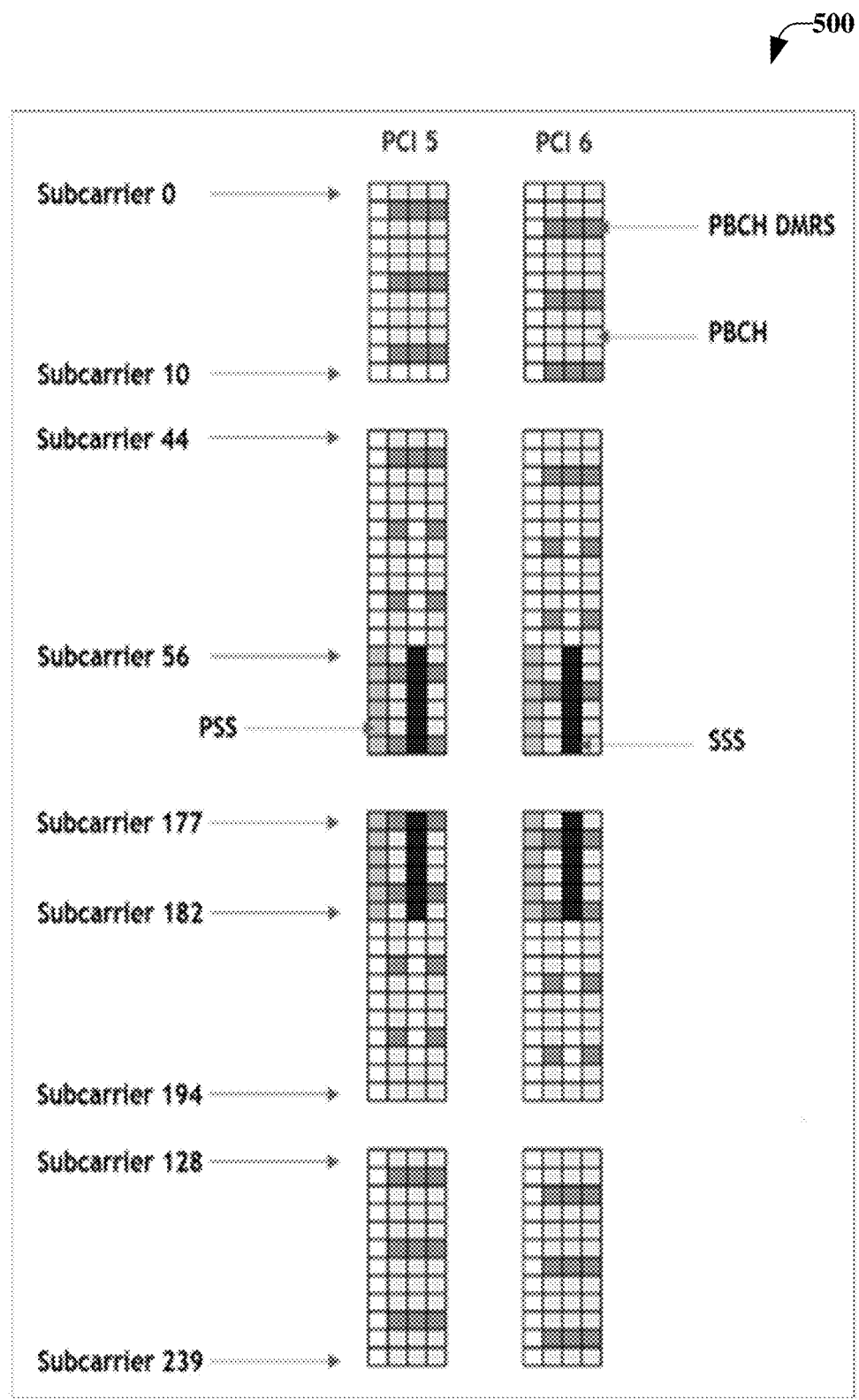
FIG. 5 illustrates an example, non-limiting, schematic representation of potential physical broadcast channel demodulation reference signal collisions in physical cell identity design.

In further detail, FIG. 5 illustrates an example, non-limiting, schematic representation 500 of potential PBCH DMRS collisions in 5G PCI design. Specifically, FIG. 5 illustrates the PCI modulo-4 requirement in 5G PCI assignment. As illustrated, the PBCH DMRS moves in frequency domain with change of PCI. Every fourth PCI will have the same DMRS positions. Thus, when the same PCI modulo-4 are used in neighboring cells, the UE device will not be able to differentiate the RS from the two cells (especially in TDD deployment), causing errors in RF quality measurements during initial access and reselection. Accordingly, there is a need to avoid/minimize the PCI modulo-4 assignment to neighbor cells.

Similarly, several rules should be followed in 5G RSI assignment to avoid the reception of false preambles in random access to 5G NR by UE devices. For good network accessibility performance, a cell should have sixty-four (64) preamble sequences which are generated from the cell's root sequences. The number of root sequences required for generating 64 preambles depends on the cell radius. The larger the cell radius, the more root sequences are required per cell for generating 64 preambles for UE device uplink random access.

There are either 839 or 139 unique RSIs depending on whether long sequence (839 RSIs) or short sequence (139 RSIs) is employed in the deployment bands. Long sequence is generally used for deployment where cell radius is large, while short sequence is generally used for deployment where cell radius is small.

In further detail, 839 long sequence ($L_{RA}$=839) can comprise four preamble formats (similar to LTE). These formats can be designed for large cell deployment in FR1 (Sub-6 GHz range). Further, the formats use subcarrier spacing of 1.25 KHz or 5 KHz. For 139 short sequence ($L_{RA}$=139), there can be nine preamble formats. These formats can be designed for small cell deployment including indoor coverage. Further, these preamble formats are used for both FR1 (sub-6 GHz) and FR2 (mmWave) ranges. In FR1, it supports 15 or 30 KHz subcarrier spacing. In FR2, it supports 60 or 120 KHz subcarrier spacing.

Figure 6:
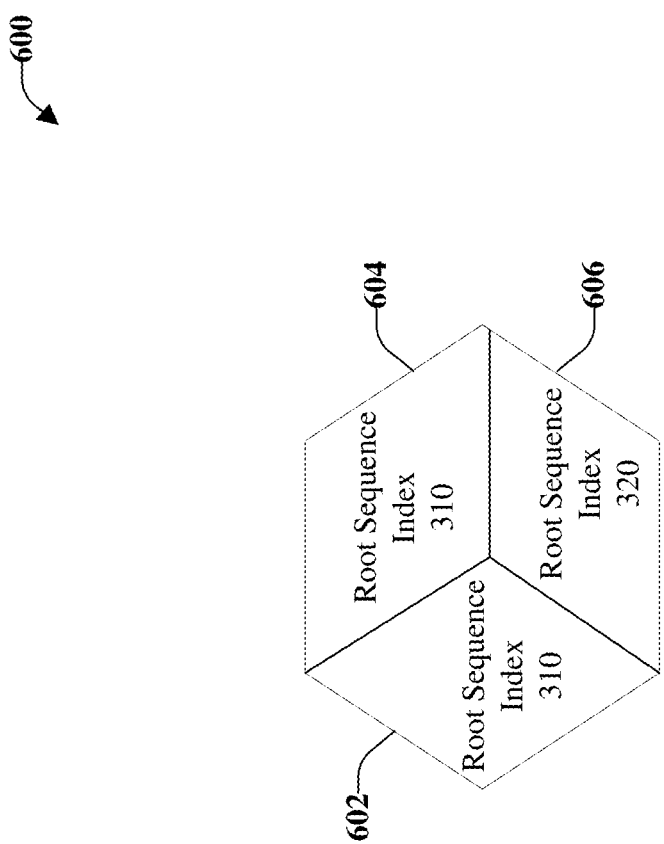
FIG. 6 illustrates a specific example, of allocation based on a root sequence index.

FIG. 6 illustrates a specific example, of allocation based on a root sequence index. If root sequence index is 300, $L_{RA}$=839 and cyclic shift $N_{CS}$ is 119, then the number (#) of RSIs per cell is:

$$\# \text{ of } RSIs = \left\lceil \frac{64}{839/119} \right\rceil = 10$$

This means that if RSI 300 is allocated to cell X 602, then cell Y 604 must have RSI 310 and cell Y 606 must have RSI 320.

In RSI assignment, adjacent cells should be assigned with different RSIs. An RSI assignment example for long sequence is depicted in FIG. 7, which illustrates an example, non-limiting, representation of an RSI assignment deployed in a wireless communications network 700.

Figure 7:
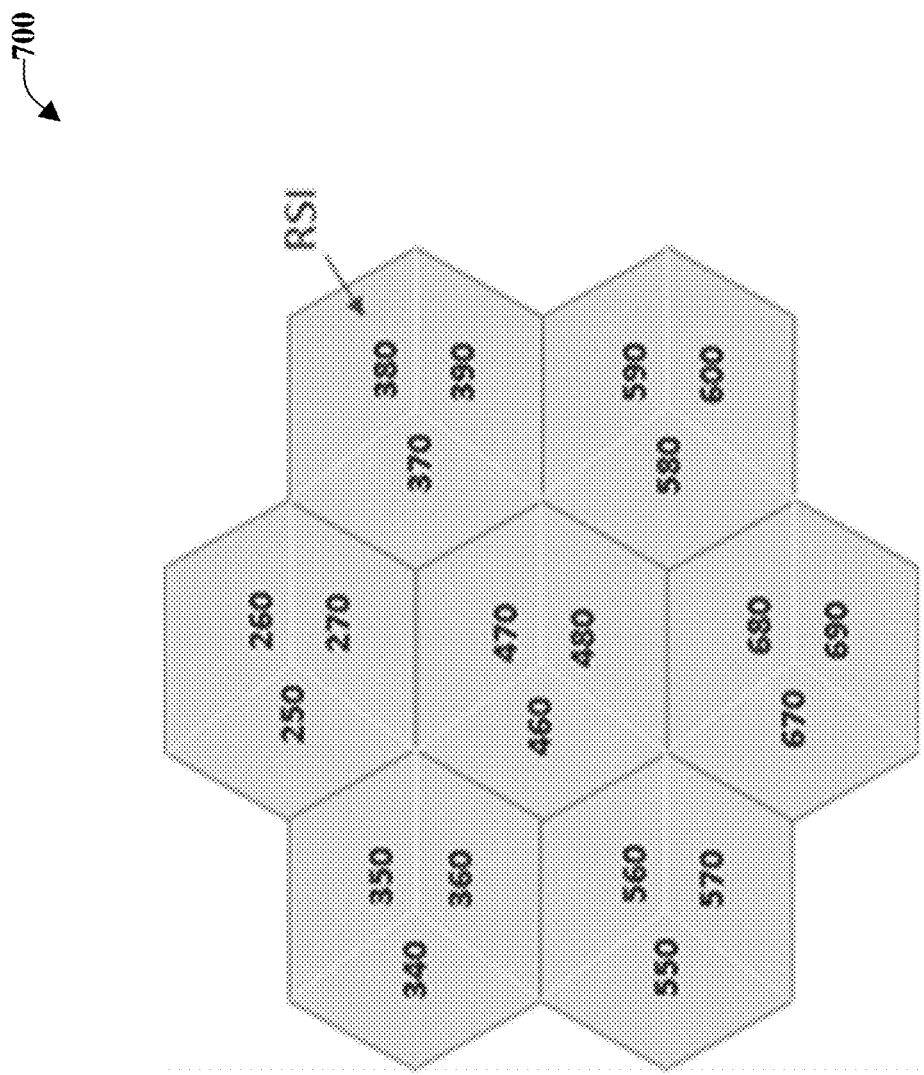
FIG. 7 illustrates an example, non-limiting, representation of a root sequence index assignment deployed in a wireless communications network.

As depicted in FIG. 7, the cell radius determines that 10 RSIs are needed for generating 64 preambles per cell. Thus, RSIs are assigned in space of 10. For example, cell label with RSI 340 means that RSI 340 through RSI 349 are assigned to that cell. In another example, the cell labeled with RSI 260 means that RSI 260 through RSI 269 are assigned to that cell. In a further example, the cell labeled with RSI 380 means that RSI 380 through RSI 389 are assigned to that cell, and so forth. The cells are also assigned so that no two adjacent cells have the same RSIs. Otherwise, same access preambles will be generated from two neighboring cells, causing uplink random access failures to the UE devices at the edge of the two neighboring cells.

All the rules and constraints described above should be followed within the deployment of same frequency band. For example, if there are two bands deployed in a market by the same operator (e.g., band 5 and band 25), then the rules apply only within band 5 deployment and within band 25 deployment. In other words, the same PCI for inter-frequency neighbors are allowed (e.g., PCI 127 can be assigned to a band 5 cell and band 25 cell even if they are inter-frequency neighbors). The same applies to RSI rules.

In addition to the rules and constraints listed above that should be followed for PCI/RSI assignment, a few soft constraints should be followed. For example, in three-sector macro cell deployment, it is preferred that the three cells at a gNodeB macro-site share the same PSS ($N_{ID}^{(2)}$) with their SSS ($N_{ID}^{(1)}$) being assigned to be 0, 1, and 2, respectively. Also, the PCI/RSI reuse distance (e.g., the distance between two cells assigned with same PCI/RSI) should be maximized.

The PCI/RSI assignment problem is a type of "assignment problem," which can be written as a mixed integer programming problem. For example, if the PCI mod-4 requirements are not considered, the PCI assignment problem can be modeled as an integer programming problem as follows:

$$\text{Maximize } z = \sum_{\substack{i,j,k \\ i \neq j}} dist(i, j) * Y[i, j, k]$$

Subject to:

$$Y[i, j, k] \geq X[i, k] + X[j, k] - 1, \quad \forall\, i, j \in \text{CELL}, i \neq j, \forall\, k \in PCI$$
$$Y[i, j, k] \geq X[i, k], \quad \forall\, i, j \in \text{CELL}, i \neq j, \forall\, k \in PCI$$
$$Y[i, j, k] \geq X[j, k], \quad \forall\, i, j \in \text{CELL}, i \neq j, \forall\, k \in PCI$$
$$\sum_{k \in PCI} Y[i, j, k] \leq N_1(i, j), \quad \forall\, i, j \in \text{CELL}, i \neq j$$
$$\sum_{k \in PCI} Y[i, j, k] \leq N_2(i, j), \quad \forall\, i, j \in \text{CELL}, i \neq j$$
$$Y[i, j, k] \in \{0, 1\}, \quad \forall\, i, j \in \text{CELL}, i \neq j, \forall\, k \in PCI$$
$$X[i, k] \in \{0, 1\} \quad \forall\, i \in \text{CELL}, \forall\, k \in PCI$$

where set CELL is the set of all cells considered, set PCI is the set of PCIs used, dist(i,j) is the distance between cells i and j, and $$N_1(i, j) = \begin{cases} 0 & \text{if cells } i \text{ and } j \text{ are direct neighbors} \\ 1 & \text{otherwise} \end{cases}$$

$$N_2(i, j) = \begin{cases} 0 & \text{if cells } i \text{ and } j \text{ are secondary neighbors} \\ 1 & \text{otherwise} \end{cases}$$

The solution X [i, k] of this integer programming problem would indicate $$X[i, k] = \begin{cases} 1 & \text{if cell } i \text{ is assigned with } PCI\ k \\ 0 & \text{otherwise} \end{cases}$$

and $$Y[i, j, k] = \begin{cases} 1 & \text{if both cells } i \text{ and } j \text{ are assigned with } PCI\ k \\ 0 & \text{otherwise} \end{cases}$$

An assignment problem is a nondeterministic polynomial time (NP) complete problem for which there does not exist an optimal solution in polynomial time. Adding the mod-4 requirement would make it even harder in solving it for a true optimal solution. As discussed herein, this problem can be solved using a heuristic algorithm, which provides an acceptable solution approximating to its optimum.

The various aspects discussed herein can operate in at least two phases. In the first phase, the SSS ID ($N_{ID}^{(1)}$) can be assigned to the cell. Further, the network can be represented as a graph where vertices present the sites (gNodeB's) and edge is defined between two vertices (gNodeB sites) if site distance is less than tentative SSS ID re-use distance, or there is direct neighbor relationship between the two, or there is secondary neighbor relationship between the two.

Figure 8:
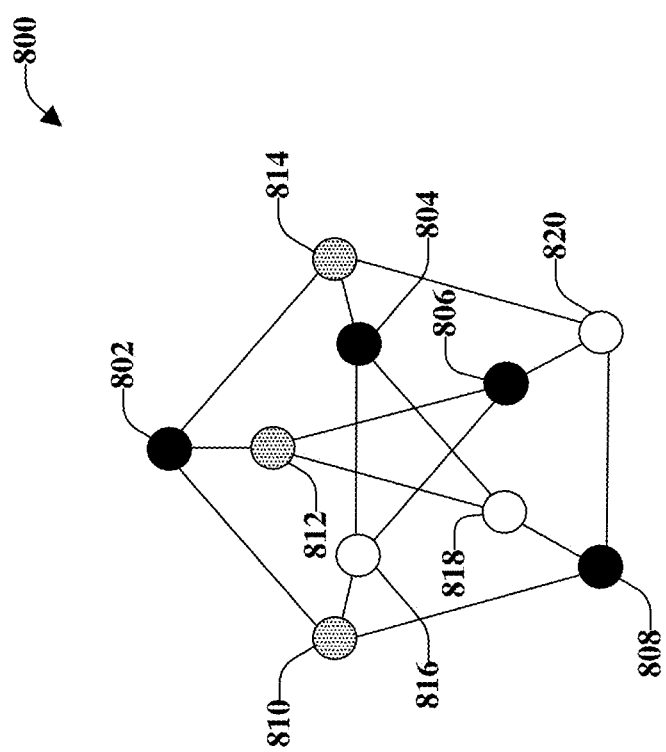
FIG. 8 illustrates scrambling code assignments represented as a graph coloring theory, according to an aspect.

Up to 335 SSS IDs can be assigned to the gNodeB's in the network represented by the graph. Then it can become a graph coloring problem with up to 335 colors, as depicted in FIG. 8, which illustrates scrambling code assignments represented as a graph coloring theory, according to an aspect. Graph coloring is a special case of graph labeling and refers to an assignment of labels, referred to as "colors," to elements of a graph. The assignment of colors can be subject to constraints. In the example edge coloring graph, colors are assigned to each edge so that adjacent edges do not share the same color.

In further detail, the PSS conflict issue is related to a coloring problem. Vertices, illustrated as circles, represent the sites. An edge, illustrated as a line, is defined between two vertices if site distance (or weighted cell distance) is less than tentative SSS ID re-use distance, or if there is a direct neighbor relationship (e.g., FIG. 2), or if there is a secondary neighbor relationship (e.g., FIG. 3). For explanation purposes, the simple graph utilizes three colors. A first color is represented by filled circles 802, 804, 806, and 808. A second color is represented by partially filled circles 810, 812, and 814. A third color is represented by unfilled circles 816, 818, and 820.

For the PSS planning issue, the question is whether the vertices can be colored by 335 colors, such that no two adjacent vertices share the same color. The 335 colors represent the number of PSSs that can be assigned. It should be noted that although generally 335 PSSs are available (e.g., numbered 0 to 334), some PSSs might be reserved and not available for assignment to cells.

The graph coloring problem is a NP-Complete equation and thus, exponential time is generally needed to solve the equation by linear programming. Further, in some aspects a heuristic algorithm can be utilized, such as a greedy coloring algorithm, in an attempt to perform PSS planning. For example, greedy coloring can be based on a specific vertices ordering. According to some implementations, the model of FIG. 8 can be utilized to solve the PCI/RSI assignment problem as a graph coloring problem. For example, a heuristic coloring algorithm based on a "smallest first" ordering can be utilized.

For example, at the end of the first phase, all gNodeB's can be assigned with the optimal SSS ID's in the network. In phase 2, the PSS ID ($N_{ID}^{(2)}$) can be assigned to the cells at the gNodeB's. If a cell is a single omni-cell at the gNodeB, an arbitrary PSS ID can be assigned to the cell. If there are 3 cells (for a particular frequency) at the gNodeB, PSS ID's can be assigned to the three cells as illustrated in FIGS. 8A, 8B, and 8C, which illustrate a Phase 2 of PCI Assignment Algorithm.

A cell's azimuth information can be used in PSS assignment in phase 2. The three PSS ID's ($N_{ID}^{(2)}$=0, 1, or 2) can be assigned to three cells on each gNodeB. For two cells at two adjacent gNodeB's, the same PSS ID's can be assigned to the cells if the cells point to the opposite directions. Otherwise, different PSS ID's are assigned to the cells. Mod-4 requirement should also be enforced when assigning the PSS ID's.

Figure 9A:
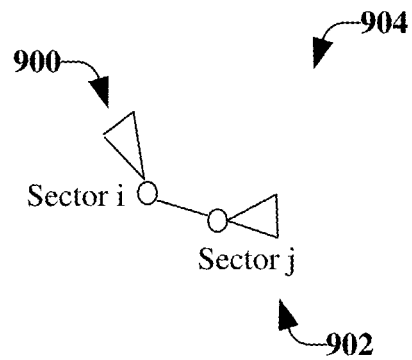
FIG. 9A illustrates a first case where the same primary synchronization signal identifier can be assigned to the sectors.
Figure 9B:
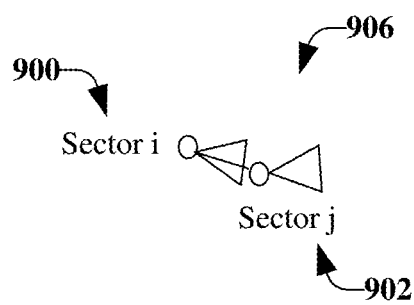
FIG. 9B illustrates a second case for which different primary synchronization signal identifiers should be assigned.
Figure 9C:
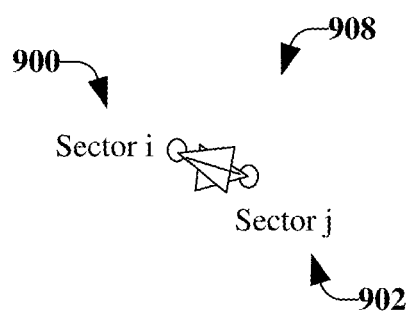
FIG. 9C illustrates a third case for which different primary synchronization signal identifiers should be assigned.

For example, FIGS. 9A-9C illustrate schematic representations of three cases where the primary scrambling code reuse distance depends on coverage or overlap between two cells, according to an aspect. Instead of the defined PSS reuse distance being a universal value, a binary indicator U(i,j) can be calculated based on radio frequency (RF) coverage, where U(i,j)=1 indicates that cell i and cell j are not interfering with each other based on a coverage map, even if assigned the same PSS. Otherwise, U(i,j)=0. In the colored graph representation discussed above, the edge is defined if U(i,j)=0.

Illustrated in each of the three cases of FIGS. 9A-9C are two cells, Cell i 900 and Cell j 902. FIG. 9A illustrates a first case 904 where the same PSS id can be assigned to the sectors. FIGS. 9B and 9C illustrates a second case and a third case, respectfully for which different PSS identifiers should be assigned. For the optimal PSS ID allocation, for FIGS. 9A-9C, the SS id for each gNobeB can be taken for SSS id allocation results. Three PSS Ids can be assigned to three sectors on each gNodeB. For adjacent gNodeBs, assign different PCIs for sectors pointing towards each other.

In an example, ATOLL cell coverage can be incorporated with the disclosed aspects. A recommended PSS reuse distance should not be a universal value. Instead, the PSS reuse distance should depend on cell coverage between two cells. For example, a binary indicator U(i,j) can be calculated based on ATOLL predicted coverage. U(i,j) means that cell i and cell j are not interfering with each other based on ATOLL, even if the same PSS code is assigned. It is zero otherwise. In the graph representation, the edge is defined if (and only if) U(i,j) is equal to zero.

As discussed herein, the RSI optimization algorithm follows a similar principle as the heuristic algorithm for PCI. First, the number of RSI ID's needed (=$N_r$) is determined based on the cell radius in the network. Thereafter, the available RSI ID's ($L_{RA}$) can be divided by $N_r$, which ($N_g = \lceil L_{RA}/N_r \rceil$) gives the number of unique RSI groups that can be used for the assignment.

For example, in a short sequence deployment ($L_{RA}$=139) scenario and assume $N_r$=10 (corresponding to cell radius being 1 km in certain deployment setting), there can be $N_g$=13 RSI groups that can be used for RSI assignment to cells in the network. Short sequence deployment is used typically for omni-cell deployment, in which case, the network can be represented as a graph (no secondary neighbor relations need to be considered) and the RSI groups can be assigned to the omni-cells using the heuristic coloring algorithm with 13 colors.

In a long sequence deployment ($L_{RA}$=839) scenario and assume $N_r$=10 (corresponding to cell radius being 16 km in certain deployment setting), there can be $N_9$=83 RSI groups that can be used for RSI assignment to cells in the network. In case it is a 3 sector gNodeB macro site network, the 83 RSI groups can be forward divided by three to create three categories (similar to PSS ID's) of RSI groups, with each category having 27 groups (similar to SSS ID's, but with 27 ID's not 335). The 2-phase approach can be used to solve the RSI assignment problem, similar to the PCI assignment problem. While the constraints are more relaxed in RSI assignment (no need to consider secondary neighbor relations, and no need to consider mod-4 requirement), there can be fewer colors available (in this example 27 compared to 335) for the assignment.

Figure 10:
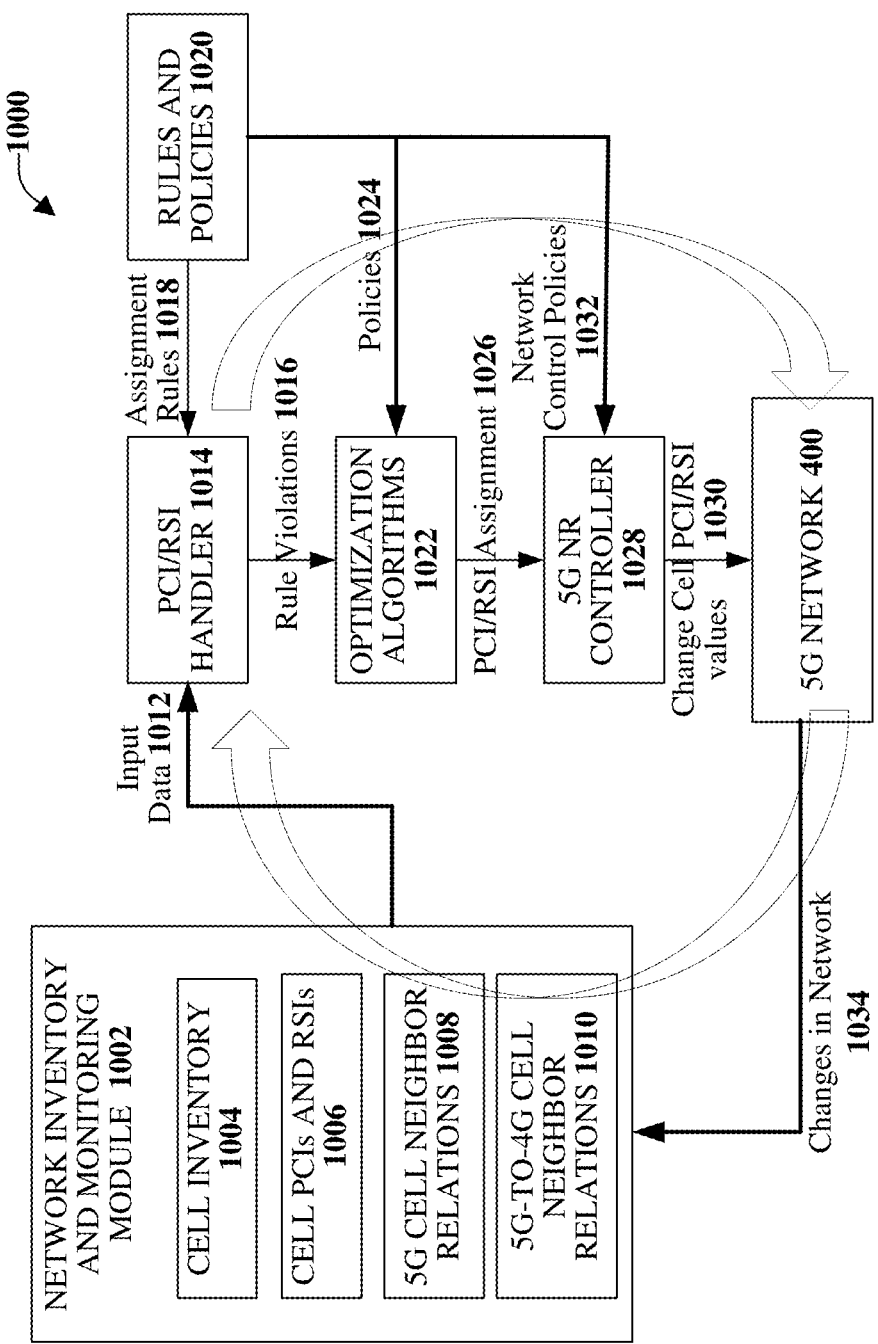
FIG. 10 illustrates a closed loop automation system that provides optimal physical cell identity/root sequence index assignment for advanced networks in accordance with one or more embodiments described herein.

FIG. 10 illustrates a closed loop automation system 1000 that provides optimal PCI/RSI assignment for 5G networks in accordance with one or more embodiments described herein. Repetitive description of like elements employed in other embodiments described herein is omitted for sake of brevity. The system 1000 can comprise one or more of the components and/or functionality of the system 100, and vice versa.

The system 1000 can include a network inventory and monitoring module 1002 that can store cell inventory information 1004. The network inventory and monitoring module 1002 can also monitor the changes in the 5G NR network 400. The changes can include, but are not limited to: cell additions/removals, PCI/RSI changes 1006, and/or cell neighbor relation changes in the network (e.g., 5G cell neighbor relations 1008, 5G-to4G cell neighbor relations 1010). The network inventory and monitoring module 1002 can send the cell inventory and configuration changes, as input data 1012, to a PCI/RSI handler 1014. The PCI/RSI handler 1014 can evaluate any violations 1016 based on PCI/RSI assignment rules 1018 provided by a rules and policies module 1020. If any violations are found, the PCI/RSI module (e.g., the PCI/RSI handler 1014) can invoke an optimization algorithm module 1022, which can implement the optimization algorithms based on optimization policies 1024 set by the rules and policies module 1020. The optimization algorithms can generate optimal PCI/RSI assignment results 1026 which are sent to a 5G NR controller device 1028 for executions. The 5G NR controller device 1028 can execute the optimal PCI/RSI assignments 1026 by changing cell PCI/RSI to optimal values 1030 at the corresponding 5G cells in the 5G network 400.

The input data that the network inventory and monitoring module 1002 stores and monitors can include cell inventory 1004 and configuration data, such as cell name/ID and market information, cell locations, cell azimuth, cell band information, cell central frequency (NR-ARFCN), cell PCI, cell RSI, cell operational status, and so on. The input data can also include 5G cell neighbor relations 1008, which can be the 5G neighboring cell lists for each 5G cell. In addition, the input data can also include the 5G-to-4G neighbor relations 1010, which can be the master eNodeB of each 5G cell, and/or other relevant 5G network information.

The PCI/RSI handler module 1014 can take the input data 1012 from the network inventory and monitoring module 1002 and can evaluate the cell PCI/RSI for any violations to the rules provided in the rule and policy module 1020. The rules can include all rules and constraints described above, including PCI collisions, PCI confusions, PCI mod-4 requirements, RSI assignment rules, and so forth. If any violations are found, the PCI/RSI handler module 1014 can send the input data to the optimization algorithm module 1022 for PCI/RSI assignment optimization.

The optimization algorithm module 1022 can take the input data and can optimize the cell PCI/RSI assignment of the network using the heuristic coloring algorithm. Specific optimization policies (e.g., constraints, preference, and so on) can be enforced via the rules and policies module 1020. The optimal PCI/RSI assignment 1026 results from the optimization algorithm module 1022 can be then sent to the 5G NR controller module 1028 where the changes to the cell PCI/RSI values can be enforced to the gNodeBs. Certain network control policies 1032, such as change revert policies, can be enforced at the 5G NR controller module 1028 based on the policies provided by the rules and policies module 1020. The closed loop starts with the collection of network change data, and ends with the completion of implementing the cell PCI/RSI value changes at the corresponding at the gNodeB sites. The changes in the network 1034 can include, but are not limited to, cell additions and/or removals, PCI/RSI changes, neighbor relations changes, and so on.

As discussed herein, the various aspects can facilitate a model-driven automated procedure for cell PCI and RSI allocation optimization in a mobile network (e.g., a 5G mobile network). The disclosed aspects not only provide an initial optimal PCI/RSI design, but also continually adjust the PCI/RSI allocations to avoid network performance degradations due to any potential PCI/RSI conflicts introduced by the neighbor relation changes.

The disclosed aspects can model the 5G PCI/RSI optimization as an integer programming problem and discussed are procedures for solving the problem. The various aspects can avoid and/or mitigate any PCI collisions and reception of false preambles, minimizes PCI confusions, and maximizes PCI/RSI reuse distance with 5G PCI/RSI requirements. The disclosed aspects can also minimize the PCI/RSI changes to the existing allocations. A number of requirements can be added to the optimization problem, including modulo-3 and PCI modulo-4 requirements where no PCI modulo-3 and modulo-4 assignment to neighbor cells, and PCI allocation requirements such as same SSS ID on each site and different PSS ID for different sectors at the site. In an example, according to modulo-3 rule, the same PSS ID should not be allocated to two adjacent cells (same PSS may cause UE synchronization delay). Further, PCI reuse should be spread as far as possible.

The disclosed aspects can also address PCI/RSI optimization in different 5G deployment scenarios, including non-standalone and standalone deployment, deployments with macro-cells and small cells, sub6 and mmWave, and different 5G NR preamble formats with long and short RSI sequences.

Further, the disclosed aspects provide an automated system where the optimization algorithms are implemented as a closed loop SON use case in various platforms. The disclosed system is also policy-driven, where PCI/RSI optimization requirements are added and/or removed through policies and rules.

In an example, provided is a method and a policy-driven automated system for cell PCI/RSI allocation optimization in a 5G mobile network. Also provided is a 5G PCI/RSI optimization model as an integer programming problem. In another example, provided are methods and algorithms providing solutions to the integer programming problem. As mentioned, the various aspects can avoid and/or mitigate PCI collisions and reception of false preambles, minimizes PCI confusions, and maximizes PCI/RSI reuse distance with 5G PCI/RSI requirements.

The various aspects can be implemented as a PCI design execution via APIs to vendor EMS. The PCI designs can cover both macro-cells and small cells. Further, automatic PCI adjustment can be based on neighbor relation changes in 5G RAN.

Methods that can be implemented in accordance with the disclosed subject matter, will be better appreciated with reference to various flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 11:
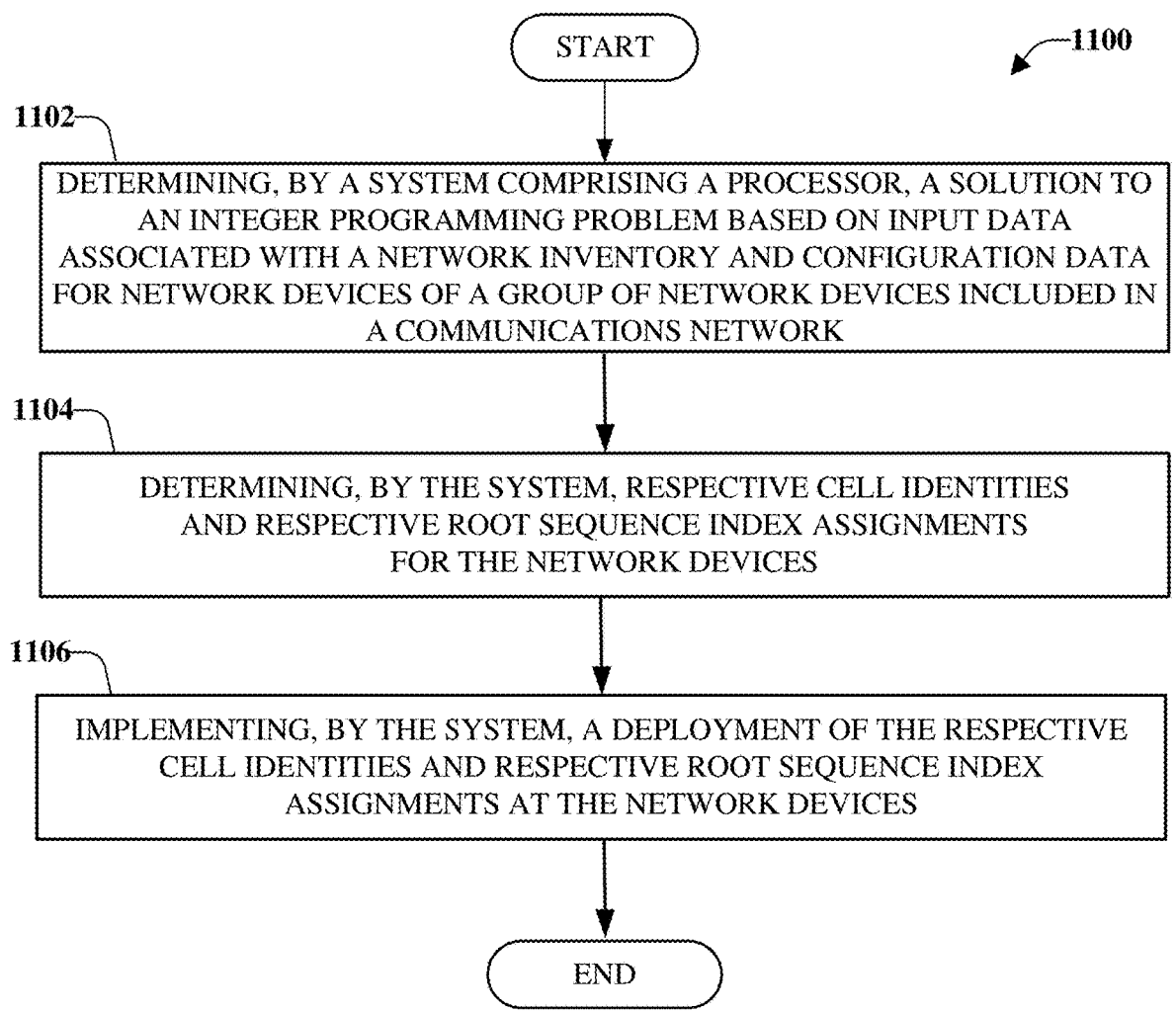
FIG. 11 illustrates a flow diagram of an example, non-limiting, computer-implemented method for facilitating model-driven automated cell allocation in advanced networks in accordance with one or more embodiments described herein.

FIG. 11 illustrates a flow diagram of an example, non-limiting, computer-implemented method 1100 for facilitating model-driven automated cell allocation in advanced networks in accordance with one or more embodiments described herein. Repetitive description of like elements employed in other embodiments described herein is omitted for sake of brevity.

In some implementations, a system comprising a processor can perform the computer-implemented method 1100 and/or other methods discussed herein. In other implementations, a device comprising a processor can perform the computer-implemented method 1100 and/or other methods discussed herein. In other implementations, a machine-readable storage medium, can comprise executable instructions that, when executed by a processor, facilitate performance of operations, which can be the operations discussed with respect to the computer-implemented method 1100 and/or other methods discussed herein. In further implementations, a computer readable storage device comprising executable instructions that, in response to execution, cause a system comprising a processor to perform operations, which can be operations discussed with respect to the computer-implemented method 1100 and/or other methods discussed herein.

At 1102 of the computer-implemented method 1100, a system comprising a processor can determine a solution to an integer programming problem (e.g., via the optimization component 108). The determination of the solution can be based on input data associated with a network inventory and configuration data for network devices of a group of network devices included in a communications network. Further, at 1104, the system can determine respective cell identities and respective root sequence index assignments for the network devices (e.g., via the generation component 110).

At 1106, the system can implement a deployment of the respective cell identities and respective root sequence index assignments at the network devices (e.g., via the implementation component 112). In an example, implementing the deployment can comprise mitigating physical cell identity collision and false preambles in random access to user equipment devices. According to another example, implementing the deployment can comprise mitigating, by the system, changes to the physical cell identity and root sequence index assignment list for existing allocations. In some implementations, the method can comprise determining, by the system, a maximum cell range mapped to a defined separation between the network devices of the group of network devices.

Figure 12:
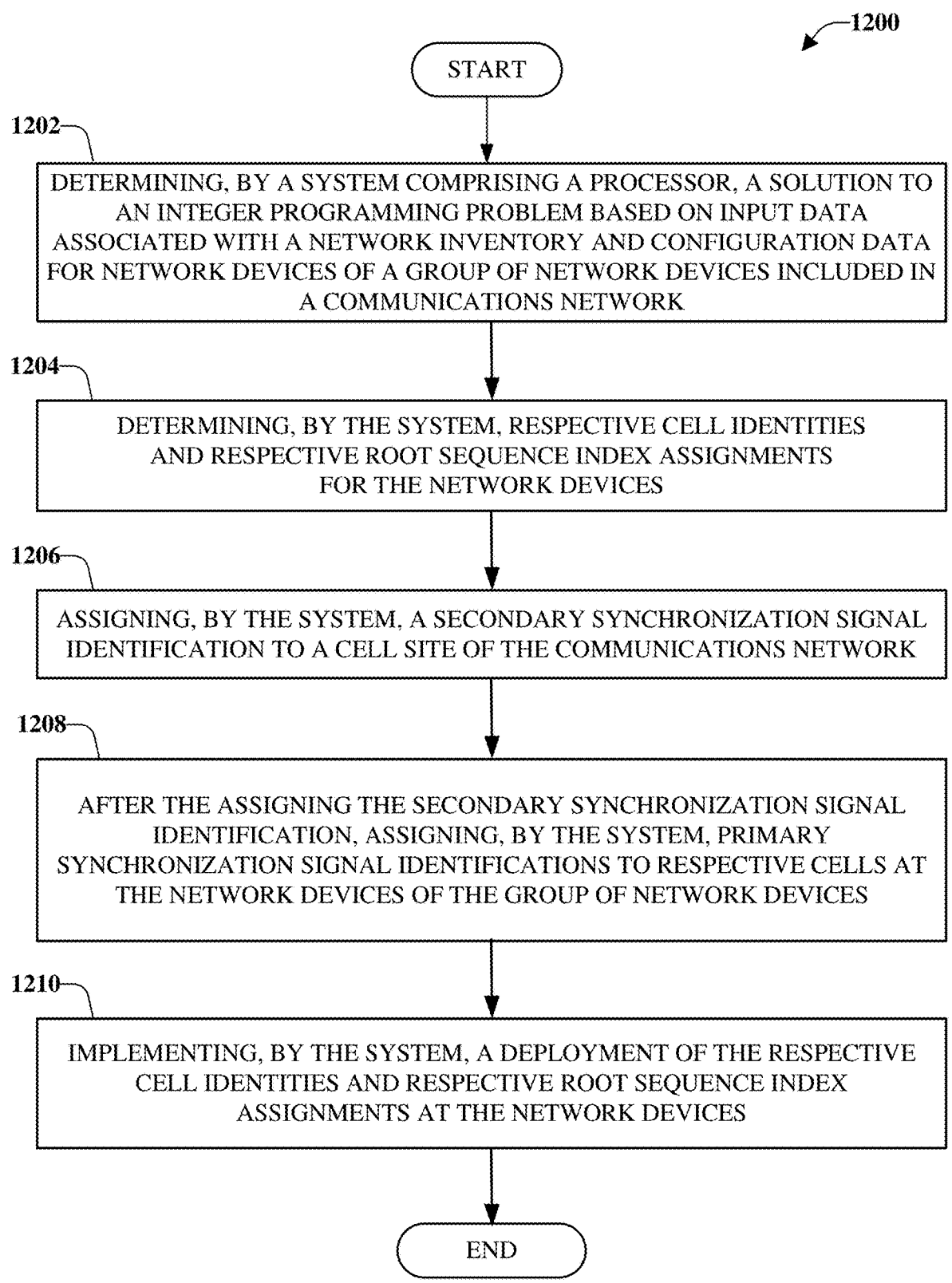
FIG. 12 illustrates a flow diagram of an example, non-limiting, computer-implemented method for assigning primary and secondary synchronization signal identifications in advanced networks in accordance with one or more embodiments described herein.

FIG. 12 illustrates a flow diagram of an example, non-limiting, computer-implemented method 1200 for assigning primary and secondary synchronization signal identifications in advanced networks in accordance with one or more embodiments described herein. Repetitive description of like elements employed in other embodiments described herein is omitted for sake of brevity.

In some implementations, a system comprising a processor can perform the computer-implemented method 1200 and/or other methods discussed herein. In other implementations, a device comprising a processor can perform the computer-implemented method 1200 and/or other methods discussed herein. In other implementations, a machine-readable storage medium, can comprise executable instructions that, when executed by a processor, facilitate performance of operations, which can be the operations discussed with respect to the computer-implemented method 1200 and/or other methods discussed herein. In further implementations, a computer readable storage device comprising executable instructions that, in response to execution, cause a system comprising a processor to perform operations, which can be operations discussed with respect to the computer-implemented method 1200 and/or other methods discussed herein.

At 1202 of the computer-implemented method 1200, a system comprising a processor can determine a solution to an integer programming problem based on input data associated with a network inventory and configuration data for network devices of a group of network devices included in a communications network (e.g., via the optimization component 108).

Further, at 1204 respective cell identities and respective root sequence index assignments for the network devices can be determined (e.g., via the generation component 110). In an example, assigning the secondary synchronization signal identification can comprise assigning respective secondary synchronization signal identifications to the network devices of the group of network devices.

At 1206, the system can assign a secondary synchronization signal identification to a cell site of the communications network (e.g., via the optimization component 108). Upon or after assigning the secondary synchronization signal identification, the system can assign primary synchronization signal identifications to respective cells at the network devices of the group of network devices, at 1208 (e.g., via the optimization component 108). A deployment of the respective cell identities and respective root sequence index assignments can be implemented at the network devices at 1210 (e.g., via the implementation component 112).

Figure 13:
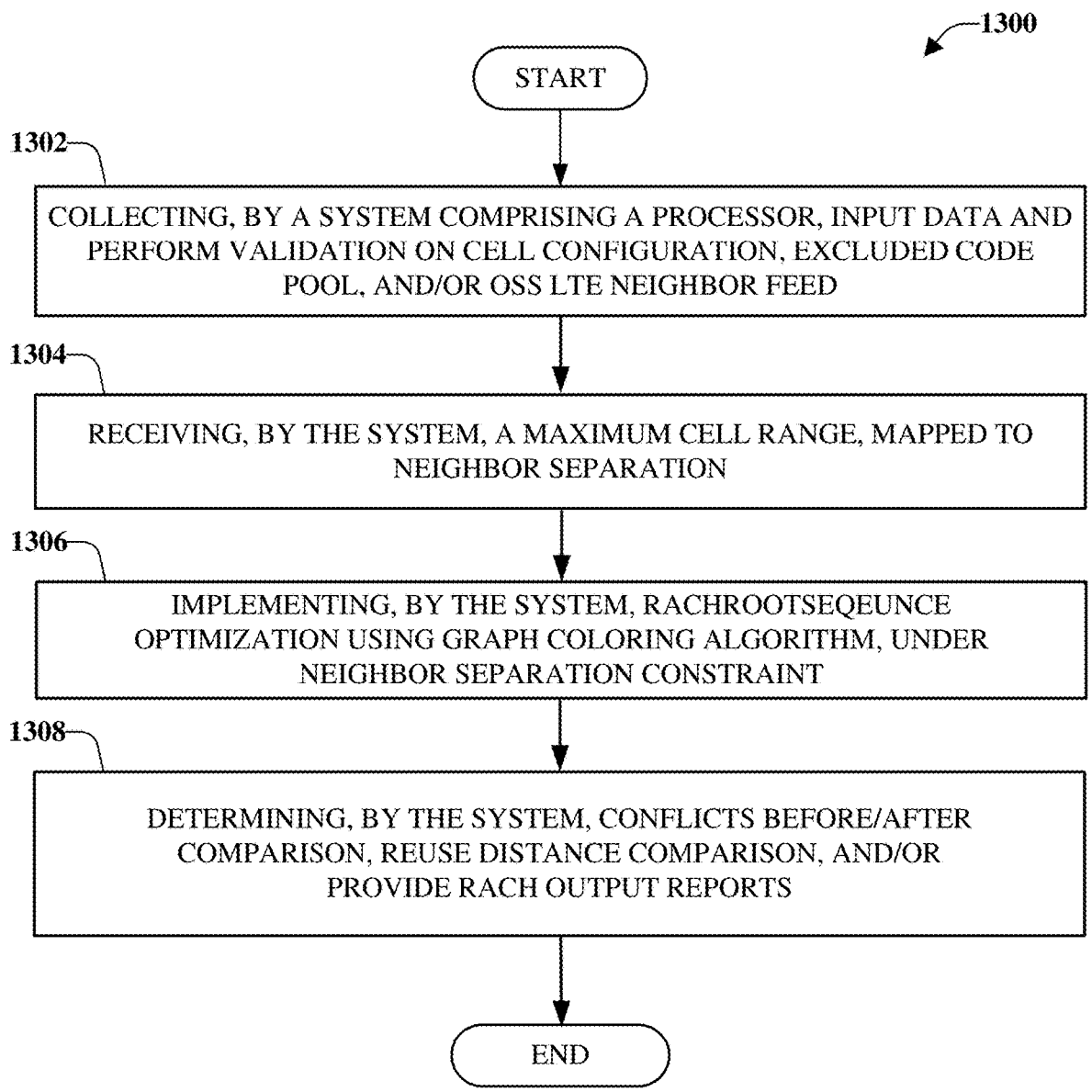
FIG. 13 illustrates a flow diagram of an example, non-limiting, computer-implemented method for facilitating root sequence index planning in advanced networks in accordance with one or more embodiments described herein.

FIG. 13 illustrates a flow diagram of an example, non-limiting, computer-implemented method 1300 for facilitating RSI planning in advanced networks in accordance with one or more embodiments described herein. Repetitive description of like elements employed in other embodiments described herein is omitted for sake of brevity.

In some implementations, a system comprising a processor can perform the computer-implemented method 1300 and/or other methods discussed herein. In other implementations, a device comprising a processor can perform the computer-implemented method 1300 and/or other methods discussed herein. In other implementations, a machine-readable storage medium, can comprise executable instructions that, when executed by a processor, facilitate performance of operations, which can be the operations discussed with respect to the computer-implemented method 1300 and/or other methods discussed herein. In further implementations, a computer readable storage device comprising executable instructions that, in response to execution, cause a system comprising a processor to perform operations, which can be operations discussed with respect to the computer-implemented method 1300 and/or other methods discussed herein.

At 1302 of the computer-implemented method 1300, a system comprising a processor can collect input data and perform validation on cell configuration, excluded code pool, and/or OSS LTE neighbor feed. At 1304, the system can receive a maximum cell range, mapped to neighbor separation. Table 3 below illustrates the cell range and the number of RACH Root Sequences.

TABLE 3

| Cell Range [km] | Number of RACH Root Sequences |
|---|---|
| 1 | 1 |
| 2-3 | 2 |
| 4-5 | 3 |
| 6 | 4 |
| 7-8 | 5 |
| 9-10 | 6 |
| 11-12 | 8 |
| 13-16 | 10 |
| 17-23 | 13 |
| 24-39 | 22 |
| 40-59 | 32 |
| 60-100 | 64 |

Further, at 1306 of the computer-implemented method 1300, the system can implement RachRootSeqeunce optimization using graph coloring algorithm, under neighbor separation constraint. Post processing can be performed, at 1308, and the system can determine conflicts before/after comparison, reuse distance comparison, and/or provide RACH output reports.

Described herein are systems, methods, articles of manufacture, and other embodiments or implementations that can facilitate model-driven automated cell allocation in advanced networks. Facilitating model-driven automated cell allocation can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (e.g., cars, airplanes, boats, space rockets, and/or other at least partially automated vehicles (e.g., drones), and so on). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

To meet the huge demand for data centric applications, 4G standards can be applied to 5G, also called New Radio (NR) access. The 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to Long Term Evolution (LTE).

Multiple Input, Multiple Output (MIMO) systems can significantly increase the data carrying capacity of wireless systems. For these reasons, MIMO is an integral part of the third and fourth generation wireless systems (e.g., 3G and 4G). In addition, 5G systems also employ MIMO systems, which are referred to as massive MIMO systems (e.g., hundreds of antennas at the transmitter side (e.g., network) and/receiver side (e.g., user equipment). With a $(M_t, M_r)$ system, where $M_t$ denotes the number of transmit antennas and $M_r$ denotes the receive antennas, the peak data rate multiplies with a factor of $M_t$ over single antenna systems in rich scattering environment.

In addition, advanced networks, such as a 5G network can be configured to provide more bandwidth than the bandwidth available in other networks (e.g., 4G network, 5G network). A 5G network can be configured to provide more ubiquitous connectivity. In addition, more potential of applications and services, such as connected infrastructure, wearable computers, autonomous driving, seamless virtual and augmented reality, "ultra-high-fidelity" virtual reality, and so on, can be provided with 5G networks. Such applications and/or services can consume a large amount of bandwidth. For example, some applications and/or services can consume about fifty times the bandwidth of a high-definition video stream, Internet of Everything (IoE), and others. Further, various applications can have different network performance requirements (e.g., latency requirements and so on).

Cloud Radio Access Networks (cRAN) can enable the implementation of concepts such as SDN and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

Figure 14:
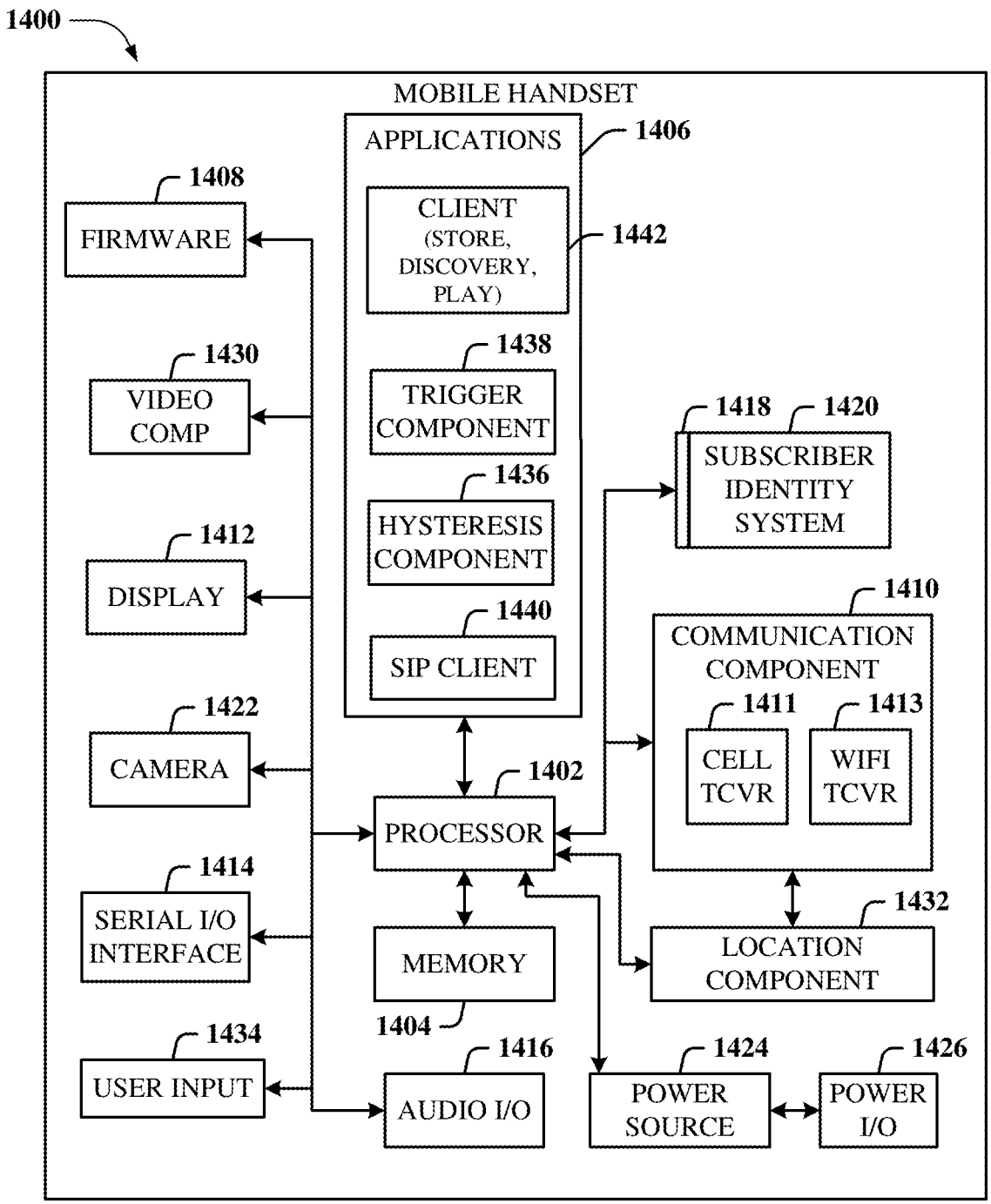
FIG. 14 illustrates an example block diagram of an example mobile handset operable to engage in a system architecture that facilitates wireless communications according to one or more embodiments described herein.

Referring now to FIG. 14, illustrated is an example block diagram of an example mobile handset 1400 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1402 for controlling and processing all onboard operations and functions. A memory 1404 interfaces to the processor 1402 for storage of data and one or more applications 1406 (e.g., a video player software, user feedback component software, etc.). Other applications can include voice recognition of predetermined voice commands that facilitate initiation of the user feedback signals. The applications 1406 can be stored in the memory 1404 and/or in a firmware 1408, and executed by the processor 1402 from either or both the memory 1404 or/and the firmware 1408. The firmware 1408 can also store startup code for execution in initializing the handset 1400. A communications component 1410 interfaces to the processor 1402 to facilitate wired/wireless communication with external systems, e.g., cellular networks, VoIP networks, and so on. Here, the communications component 1410 can also include a suitable cellular transceiver 1411 (e.g., a GSM transceiver) and/or an unlicensed transceiver 1413 (e.g., Wi-Fi, WiMax) for corresponding signal communications. The handset 1400 can be a device such as a cellular telephone, a PDA with mobile communications capabilities, and messaging-centric devices. The communications component 1410 also facilitates communications reception from terrestrial radio networks (e.g., broadcast), digital satellite radio networks, and Internet-based radio services networks.

The handset 1400 includes a display 1412 for displaying text, images, video, telephony functions (e.g., a Caller ID function), setup functions, and for user input. For example, the display 1412 can also be referred to as a "screen" that can accommodate the presentation of multimedia content (e.g., music metadata, messages, wallpaper, graphics, etc.). The display 1412 can also display videos and can facilitate the generation, editing and sharing of video quotes. A serial I/O interface 1414 is provided in communication with the processor 1402 to facilitate wired and/or wireless serial communications (e.g., USB, and/or IEEE 1394) through a hardwire connection, and other serial input devices (e.g., a keyboard, keypad, and mouse). This can support updating and troubleshooting the handset 1400, for example. Audio capabilities are provided with an audio I/O component 1416, which can include a speaker for the output of audio signals related to, for example, indication that the user pressed the proper key or key combination to initiate the user feedback signal. The audio I/O component 1416 also facilitates the input of audio signals through a microphone to record data and/or telephony voice data, and for inputting voice signals for telephone conversations.

The handset 1400 can include a slot interface 1418 for accommodating a SIC (Subscriber Identity Component) in the form factor of a card Subscriber Identity Module (SIM) or universal SIM 1420, and interfacing the SIM card 1420 with the processor 1402. However, it is to be appreciated that the SIM card 1420 can be manufactured into the handset 1400, and updated by downloading data and software.

The handset 1400 can process IP data traffic through the communications component 1410 to accommodate IP traffic from an IP network such as, for example, the Internet, a corporate intranet, a home network, a person area network, etc., through an ISP or broadband cable provider. Thus, VoIP traffic can be utilized by the handset 1400 and IP-based multimedia content can be received in either an encoded or decoded format.

A video processing component 1422 (e.g., a camera) can be provided for decoding encoded multimedia content. The video processing component 1422 can aid in facilitating the generation, editing, and sharing of video quotes. The handset 1400 also includes a power source 1424 in the form of batteries and/or an AC power subsystem, which power source 1424 can interface to an external power system or charging equipment (not shown) by a power I/O component 1426.

The handset 1400 can also include a video component 1430 for processing video content received and, for recording and transmitting video content. For example, the video component 1430 can facilitate the generation, editing and sharing of video quotes. A location tracking component 1432 facilitates geographically locating the handset 1400. As described hereinabove, this can occur when the user initiates the feedback signal automatically or manually. A user input component 1434 facilitates the user initiating the quality feedback signal. The user input component 1434 can also facilitate the generation, editing and sharing of video quotes. The user input component 1434 can include such conventional input device technologies such as a keypad, keyboard, mouse, stylus pen, and/or touchscreen, for example.

Referring again to the applications 1406, a hysteresis component 1436 facilitates the analysis and processing of hysteresis data, which is utilized to determine when to associate with the access point. A software trigger component 1438 can be provided that facilitates triggering of the hysteresis component 1436 when the Wi-Fi transceiver 1413 detects the beacon of the access point. A SIP client 1440 enables the handset 1400 to support SIP protocols and register the subscriber with the SIP registrar server. The applications 1406 can also include a client 1442 that provides at least the capability of discovery, play and store of multimedia content, for example, music.

The handset 1400, as indicated above related to the communications component 1410, includes an indoor network radio transceiver 1413 (e.g., Wi-Fi transceiver). This function supports the indoor radio link, such as IEEE 802.11, for the dual-mode GSM handset 1400. The handset 1400 can accommodate at least satellite radio services through a handset that can combine wireless voice and digital radio chipsets into a single handheld device.

Figure 15:
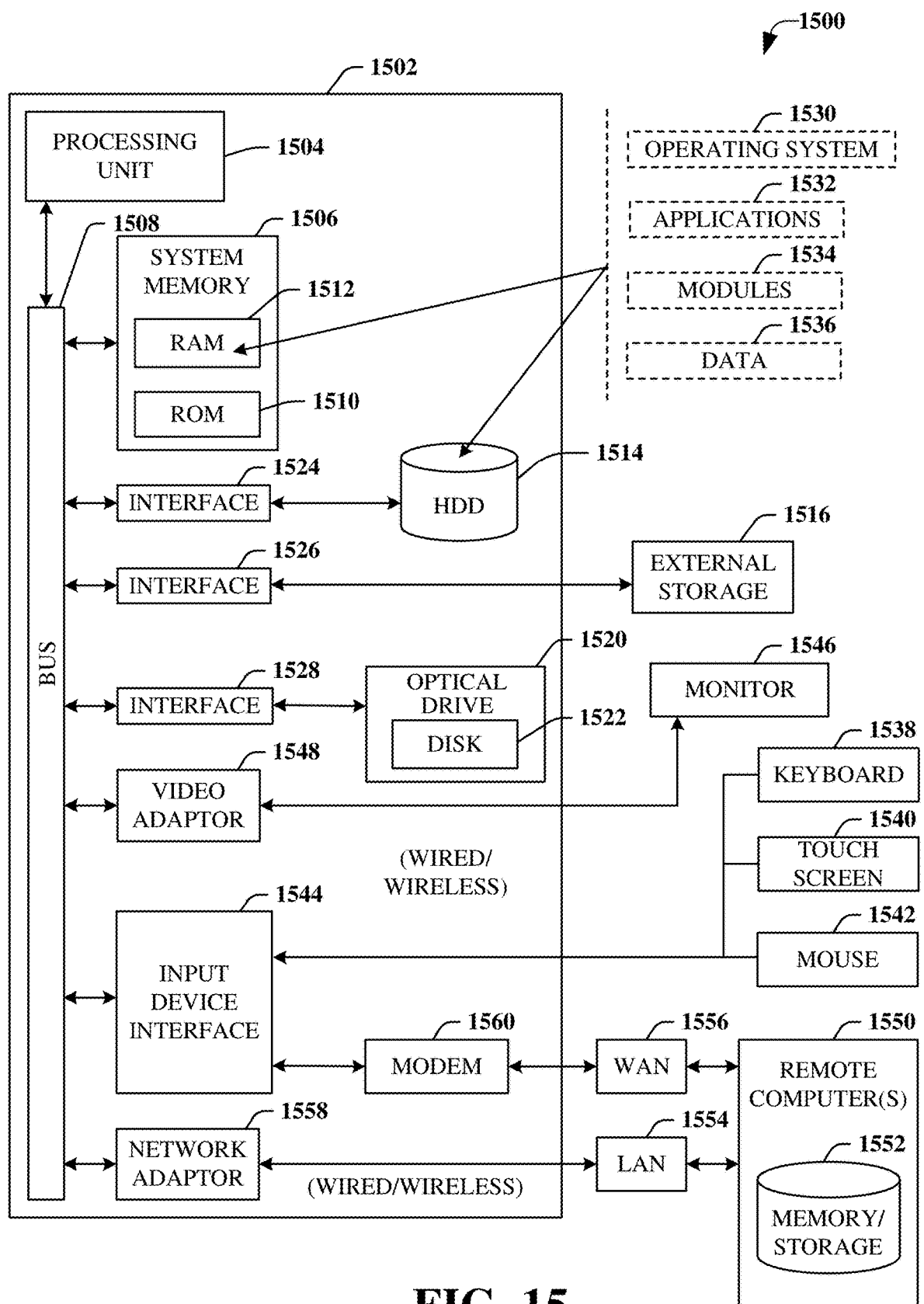
FIG. 15 illustrates an example block diagram of an example computer operable to engage in a system architecture that facilitates wireless communications according to one or more embodiments described herein.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed aspects can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and an optical disk drive 1520 (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enable with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device,"

"mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A device, comprising:
a processor; and
a memory that stores executable instructions that, when executed by the processor, facilitate performance of operations, comprising:
obtaining input data comprising a network inventory and configuration data for a group of network equipment;
implementing an optimization procedure on the input data comprising implementing the optimization procedure as an integer programming problem, wherein the implementing comprises identifying neighboring network equipment determined to be local neighbors within the group of network equipment and identifying network equipment that share a same neighbor network equipment and are determined not to be local neighbors within the group of network equipment; and
generating respective physical cell identities and respective root sequence index assignment lists for network equipment of the group of network equipment based on the implementing the optimization procedure.

2. The device of claim 1, wherein the physical cell identity and root sequence index assignment list is a first physical cell identity and root sequence index assignment list, and wherein the operations further comprise:
evaluating a neighbor relation change introduced into the communications network; and
generating a second physical cell identity and root sequence index assignment list based on the evaluating.

3. The device of claim 2, wherein the evaluating the neighbor relation change comprises mitigating network performance degradation due to physical cell identity and root sequence index conflicts introduced by the neighbor relation change.

4. The device of claim 1, wherein the operations further comprise:
assigning a secondary synchronization signal identification to the communications network comprising assigning respective secondary synchronization signal identifications to network devices of the group of network equipment.

5. The device of claim 4, wherein the operations further comprise:
assigning primary synchronization signal identifications to respective cells at the network devices of the group of network equipment.

6. The device of claim 1, wherein the operations further comprise determining a maximum cell range that is mapped to a defined neighbor separation.

7. The device of claim 1, wherein the operations further comprise implementing the optimization procedure as a closed loop self-organizing network solution.

8. The device of claim 1, wherein the operations further comprise enforcing a network control policy during the implementing the optimization procedure based on a determination of a violation associated with defined assignment rules.

9. The device of claim 1, wherein the operations further comprise implementing the physical cell identity and root sequence index assignment list at respective network devices of the group of network equipment.

10. The device of claim 1, wherein the device is deployed in a non-standalone deployment architecture, and wherein the device is configured to operate according to a fifth generation communications protocol.

11. The device of claim 1, wherein the device is deployed in a standalone deployment architecture, and wherein the device is configured to operate according to a fifth generation communications protocol.

12. A method, comprising:
determining, by a system comprising a processor, a solution to an integer programming problem based on input data associated with a network inventory and configuration data for network equipment;
determining, by the system, respective cell identities and respective root sequence index assignments for the network equipment based on the solution to the integer programming problem; and
implementing, by the system, a deployment of the respective cell identities and respective root sequence index assignments at the network equipment, wherein the implementing comprises, based on a first determination that a first network equipment and a second network equipment are adjacent to a third network equipment and a second determination that the first network equipment is not adjacent to the second network equipment,
assigning, to the first network equipment, a first cell identity and a first root sequence index assignment, and
assigning, to the second network equipment, a second cell identity, different than the first cell identity, and a second root sequence index assignment, different than the first root sequence index assignment.

13. The method of claim 12, further comprising:
assigning, by the system, a secondary synchronization signal identification to a cell site of a communications network, comprising the network equipment; and
after the assigning the secondary synchronization signal identification, assigning, by the system, primary synchronization signal identifications to respective cells at the network equipment, wherein the communications network is configured to operate according to a fifth generation network communications protocol.

14. The method of claim 13, wherein the assigning the secondary synchronization signal identification comprises assigning respective secondary synchronization signal identifications to the network equipment.

15. The method of claim 12, further comprising:
determining, by the system, a maximum cell range mapped to a defined separation between the network equipment devices of the group of network devices.

16. The method of claim 13, wherein the implementing the deployment comprises mitigating, by the system, physical cell identity collision and false preambles in random access to user equipment devices.

17. The method of claim 13, wherein the implementing the deployment comprises mitigating, by the system, changes to the physical cell identity and root sequence index assignment list for existing allocations.

18. A non-transitory machine-readable medium, comprising executable instructions that, when executed by a processor, facilitate performance of operations, comprising:
- implementing an allocation procedure for a communication network based on an inventory of base stations in the communication network and respective configuration data of the base stations, wherein the allocation procedure is implemented as an integer programming problem;
- generating an assignment list for the base stations, wherein the assignment list comprises respective physical cell identities and respective root sequence indexes for the base stations, wherein the generating comprises identifying a first group of neighboring base stations of the base stations determined to be adjacent neighbors and a second group of the base stations that share a same neighbor base station and are determined not to be adjacent neighbors; and
- implementing the assignment list at the base stations.

19. The non-transitory machine-readable medium of claim 18, wherein the operations further comprise determining a maximum cell range that is mapped to a defined neighbor separation.

20. The non-transitory machine-readable medium of claim 18, wherein the operations further comprise:
- assigning a secondary synchronization signal identification to a cell site of the communication network comprising assigning respective secondary synchronization signal identifications to the base stations; and
- after the assigning the secondary synchronization signal identification, assigning primary synchronization signal identifications to respective cells at the base stations.

* * * * *